(12) United States Patent
Liberty

(10) Patent No.: US 8,937,594 B2
(45) Date of Patent: *Jan. 20, 2015

(54) 3D POINTING DEVICES WITH ORIENTATION COMPENSATION AND IMPROVED USABILITY

(71) Applicant: Hillcrest Laboratories, Inc., Rockville, MD (US)

(72) Inventor: Matthew G. Liberty, Gaithersburg, MD (US)

(73) Assignee: Hillcrest Laboratories, Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,050

(22) Filed: Nov. 26, 2013

(65) Prior Publication Data

US 2014/0078059 A1    Mar. 20, 2014

Related U.S. Application Data

(63) Continuation of application No. 13/304,854, filed on Nov. 28, 2011, now Pat. No. 8,629,836, and a continuation of application No. 12/188,595, filed on Aug. 8, 2008, now Pat. No. 8,072,424, and a (Continued)

(51) Int. Cl.
*G06F 3/033* (2013.01)
*G06F 3/0346* (2013.01)
(Continued)

(52) U.S. Cl.
CPC .............. *G06F 3/033* (2013.01); *G06F 3/0346* (2013.01); *G06F 3/0383* (2013.01); *H04N 5/4403* (2013.01); *H04N 2005/4432* (2013.01)

USPC ............................ 345/158; 345/156; 345/163

(58) Field of Classification Search
CPC ...... G06F 3/0346; G06F 3/0383; G06F 3/033
USPC .................... 345/156–169; 178/18.01–18.09, 178/19.01–19.06

See application file for complete search history.

(56) References Cited

U.S. PATENT DOCUMENTS

| 3,474,241 A | 10/1969 | Kuipers |
| 3,660,648 A | 5/1972 | Kuipers |
| 3,931,747 A | 1/1976 | Erspamer |

(Continued)

FOREIGN PATENT DOCUMENTS

| DE | 03930581 | 3/1991 |
| DE | 19701344 | 7/1997 |

(Continued)

OTHER PUBLICATIONS

Mathematical Relationship Between Equations in U.S. Appl. No. 12/147,811 and U.S. Appl. No. 12/188,595.

(Continued)

*Primary Examiner* — Vijay Shankar
(74) *Attorney, Agent, or Firm* — Patent Portfolio Builders PLLC

(57) ABSTRACT

Systems and methods according to the present invention describe 3D pointing devices which enhance usability by transforming sensed motion data from a first frame of reference (e.g., the body of the 3D pointing device) into a second frame of reference (e.g., a user's frame of reference). One exemplary embodiment of the present invention removes effects associated with a tilt orientation in which the 3D pointing device is held by a user.

18 Claims, 9 Drawing Sheets

Related U.S. Application Data continuation of application No. 11/820,517, filed on Jun. 20, 2007, now Pat. No. 7,414,611, and a continuation of application No. 11/640,677, filed on Dec. 18, 2006, now Pat. No. 7,262,760, and a continuation of application No. 11/119,719, filed on May 2, 2005, now Pat. No. 7,158,118.

(60) Provisional application No. 60/566,444, filed on Apr. 30, 2004, provisional application No. 60/612,571, filed on Sep. 23, 2004, provisional application No. 60/641,410, filed on Jan. 5, 2005.

(51) Int. Cl.
*G06F 3/038* (2013.01)
*H04N 5/44* (2011.01)

(56) References Cited

U.S. PATENT DOCUMENTS

| | | | |
|---|---|---|---|
| 4,038,876 | A | 8/1977 | Morris |
| 4,402,250 | A | 9/1983 | Baasch |
| 4,558,313 | A | 12/1985 | Garwin et al. |
| 4,558,604 | A | 12/1985 | Auer |
| 4,578,674 | A | 3/1986 | Baker et al. |
| 4,617,634 | A | 10/1986 | Izumida et al. |
| 4,623,930 | A | 11/1986 | Oshima et al. |
| 4,686,772 | A | 8/1987 | Sobel |
| 4,718,078 | A | 1/1988 | Bleidorn et al. |
| 4,787,051 | A | 11/1988 | Olson |
| 4,839,838 | A | 6/1989 | LaBiche et al. |
| 4,906,907 | A | 3/1990 | Tsuchihashi et al. |
| 4,961,369 | A | 10/1990 | McGill |
| 5,045,843 | A | 9/1991 | Hansen |
| 5,060,175 | A | 10/1991 | Cubalchini et al. |
| 5,062,696 | A | 11/1991 | Oshima et al. |
| 5,128,671 | A | 7/1992 | Thomas, Jr. |
| 5,138,154 | A | 8/1992 | Hotelling |
| 5,181,181 | A | 1/1993 | Glynn |
| 5,280,744 | A | 1/1994 | DeCarlo et al. |
| 5,327,161 | A | 7/1994 | Logan et al. |
| 5,329,276 | A | 7/1994 | Hirabayashi et al. |
| 5,331,563 | A | 7/1994 | Masumoto et al. |
| 5,359,348 | A | 10/1994 | Pilcher et al. |
| 5,369,889 | A | 12/1994 | Callaghan |
| 5,373,857 | A | 12/1994 | Hirabayashi et al. |
| 5,383,363 | A | 1/1995 | Kulmaczewski |
| 5,393,974 | A | 2/1995 | Jee |
| 5,396,265 | A | 3/1995 | Ulrich et al. |
| 5,404,307 | A | 4/1995 | Odagawa |
| 5,412,421 | A | 5/1995 | Hale et al. |
| 5,430,435 | A | 7/1995 | Hoch et al. |
| 5,440,326 | A | 8/1995 | Quinn |
| 5,453,758 | A | 9/1995 | Sato |
| 5,459,489 | A | 10/1995 | Redford |
| 5,481,957 | A | 1/1996 | Paley et al. |
| 5,484,355 | A | 1/1996 | King, II et al. |
| 5,485,171 | A | 1/1996 | Copper et al. |
| 5,506,605 | A | 4/1996 | Paley |
| 5,525,764 | A | 6/1996 | Junkins et al. |
| 5,546,309 | A | 8/1996 | Johnson et al. |
| 5,554,980 | A | 9/1996 | Hashimoto et al. |
| 5,573,011 | A | 11/1996 | Felsing |
| 5,574,479 | A | 11/1996 | Odell |
| 5,587,558 | A | 12/1996 | Matsushima |
| 5,598,187 | A | 1/1997 | Ide et al. |
| 5,615,132 | A | 3/1997 | Horton et al. |
| 5,627,565 | A | 5/1997 | Morishita et al. |
| 5,638,092 | A | 6/1997 | Eng et al. |
| 5,640,152 | A | 6/1997 | Copper |
| 5,644,082 | A | 7/1997 | Iwata et al. |
| 5,645,077 | A | 7/1997 | Foxlin et al. |
| 5,661,502 | A | 8/1997 | Cheng |
| 5,698,784 | A | 12/1997 | Hotelling et al. |
| 5,703,623 | A | 12/1997 | Hall et al. |
| 5,714,698 | A | 2/1998 | Tokioka et al. |
| 5,736,923 | A | 4/1998 | Saab |
| 5,740,471 | A | 4/1998 | Terui |
| 5,745,226 | A | 4/1998 | Gigioli, Jr. |
| 5,757,360 | A | 5/1998 | Nitta et al. |
| 5,757,362 | A | 5/1998 | Levine |
| 5,771,406 | A | 6/1998 | Sakamoto et al. |
| 5,786,805 | A | 7/1998 | Barry |
| 5,794,081 | A | 8/1998 | Itoh et al. |
| 5,796,354 | A | 8/1998 | Cartabiano et al. |
| 5,807,284 | A | 9/1998 | Foxlin |
| 5,819,206 | A | 10/1998 | Horton et al. |
| 5,822,713 | A | 10/1998 | Profeta |
| 5,825,350 | A | 10/1998 | Case, Jr. et al. |
| 5,828,987 | A | 10/1998 | Tano et al. |
| 5,835,077 | A | 11/1998 | Dao |
| 5,835,156 | A | 11/1998 | Blonstein et al. |
| 5,870,079 | A | 2/1999 | Hennessey |
| 5,878,286 | A | 3/1999 | Tomita et al. |
| 5,880,722 | A | 3/1999 | Brewer et al. |
| 5,881,321 | A | 3/1999 | Kivolowitz |
| 5,898,421 | A | 4/1999 | Quinn |
| 5,912,612 | A | 6/1999 | DeVolpi |
| 5,953,683 | A | 9/1999 | Hansen et al. |
| 5,955,988 | A | 9/1999 | Blonstein et al. |
| 6,002,394 | A | 12/1999 | Schein et al. |
| 6,016,144 | A | 1/2000 | Blonstein et al. |
| 6,028,594 | A | 2/2000 | Inoue |
| 6,043,807 | A | 3/2000 | Carroll |
| 6,047,132 | A | 4/2000 | Maeda |
| 6,049,823 | A | 4/2000 | Hwang |
| 6,069,594 | A | 5/2000 | Barnes et al. |
| 6,072,467 | A | 6/2000 | Walker |
| 6,084,577 | A | 7/2000 | Sato et al. |
| 6,104,969 | A | 8/2000 | Beeks |
| 6,115,028 | A | 9/2000 | Balakrishnan et al. |
| 6,163,021 | A | 12/2000 | Mickelson |
| 6,164,808 | A | 12/2000 | Shibata et al. |
| 6,188,392 | B1 | 2/2001 | O'Connor et al. |
| 6,191,774 | B1 | 2/2001 | Schena et al. |
| 6,198,470 | B1 | 3/2001 | Agam et al. |
| 6,208,936 | B1 | 3/2001 | Minor et al. |
| 6,282,467 | B1 | 8/2001 | Shah et al. |
| 6,369,794 | B1 | 4/2002 | Sakurai et al. |
| 6,400,996 | B1 | 6/2002 | Hoffberg et al. |
| 6,404,416 | B1 | 6/2002 | Kahn et al. |
| 6,466,198 | B1 | 10/2002 | Feinstein |
| 6,466,199 | B2 | 10/2002 | Takase et al. |
| 6,466,831 | B1 | 10/2002 | Shibata et al. |
| 6,473,713 | B1 | 10/2002 | McCall et al. |
| 6,492,981 | B1 | 12/2002 | Stork et al. |
| 6,496,779 | B1 | 12/2002 | Hwang |
| 6,515,669 | B1 | 2/2003 | Mohri |
| 6,529,161 | B2 | 3/2003 | Fukushima et al. |
| 6,544,126 | B2 | 4/2003 | Sawano et al. |
| 6,583,781 | B1 | 6/2003 | Joshi et al. |
| 6,590,536 | B1 | 7/2003 | Walton |
| 6,650,313 | B2 | 11/2003 | Levine et al. |
| 6,672,962 | B1 | 1/2004 | Ozaki et al. |
| 6,724,368 | B2 | 4/2004 | Strubbe |
| 6,727,887 | B1 | 4/2004 | Levine et al. |
| 6,744,420 | B2 | 6/2004 | Mohri |
| 6,753,849 | B1 | 6/2004 | Curran et al. |
| 6,757,446 | B1 | 6/2004 | Li et al. |
| 6,871,413 | B1 | 3/2005 | Arms et al. |
| 6,897,854 | B2 | 5/2005 | Cho et al. |
| 6,929,548 | B2 | 8/2005 | Wang |
| 6,933,923 | B2 | 8/2005 | Feinstein |
| 6,975,959 | B2 | 12/2005 | Dietrich et al. |
| 6,982,697 | B2 | 1/2006 | Wilson et al. |
| 6,984,208 | B2 | 1/2006 | Zheng |
| 6,990,639 | B2 | 1/2006 | Wilson |
| 6,998,966 | B2 | 2/2006 | Pederson et al. |
| 7,038,661 | B2 | 5/2006 | Wilson et al. |
| 7,098,891 | B1 | 8/2006 | Pryor |
| 7,155,974 | B2 | 1/2007 | Saito et al. |
| 7,158,118 | B2 * | 1/2007 | Liberty .................. 345/158 |
| 7,166,832 | B2 | 1/2007 | Takenaka |
| 7,173,604 | B2 | 2/2007 | Marvit et al. |

(56) References Cited

U.S. PATENT DOCUMENTS

| | | | |
|---|---|---|---|
| 7,188,045 B1 | 3/2007 | Cirielli | |
| 7,194,816 B2 | 3/2007 | Tamura | |
| 7,236,156 B2 | 6/2007 | Liberty et al. | |
| 7,239,301 B2 | 7/2007 | Liberty et al. | |
| 7,254,279 B2 | 8/2007 | Chen | |
| 7,262,760 B2* | 8/2007 | Liberty | 345/158 |
| 7,353,134 B2 | 4/2008 | Cirielli | |
| 7,383,517 B2 | 6/2008 | Baudisch et al. | |
| 7,409,292 B2 | 8/2008 | Eckert et al. | |
| 7,414,611 B2* | 8/2008 | Liberty | 345/158 |
| 7,421,343 B2 | 9/2008 | Hawkinson | |
| 7,487,045 B1 | 2/2009 | Vieira | |
| 7,535,456 B2 | 5/2009 | Liberty et al. | |
| 7,843,425 B2 | 11/2010 | Lu et al. | |
| 8,072,424 B2* | 12/2011 | Liberty | 345/158 |
| 8,106,795 B2 | 1/2012 | Kataoka | |
| 8,629,836 B2* | 1/2014 | Liberty | 345/158 |
| 2002/0118123 A1 | 8/2002 | Kim et al. | |
| 2002/0126026 A1 | 9/2002 | Lee et al. | |
| 2002/0140745 A1 | 10/2002 | Ellenby et al. | |
| 2002/0158843 A1 | 10/2002 | Levine et al. | |
| 2003/0107551 A1 | 6/2003 | Dunker | |
| 2003/0159051 A1 | 8/2003 | Hollnagel | |
| 2003/0193572 A1 | 10/2003 | Wilson et al. | |
| 2004/0036650 A1 | 2/2004 | Morgan | |
| 2004/0070564 A1 | 4/2004 | Dawson et al. | |
| 2004/0078194 A1 | 4/2004 | Liljeryd et al. | |
| 2004/0095317 A1 | 5/2004 | Zhang et al. | |
| 2004/0189620 A1 | 9/2004 | Roh et al. | |
| 2004/0193413 A1 | 9/2004 | Wilson et al. | |
| 2004/0204240 A1 | 10/2004 | Barney | |
| 2004/0227725 A1 | 11/2004 | Calarco et al. | |
| 2004/0229693 A1 | 11/2004 | Lind et al. | |
| 2004/0239626 A1 | 12/2004 | Noguera | |
| 2004/0268393 A1 | 12/2004 | Hunleth et al. | |
| 2005/0008148 A1 | 1/2005 | Jacobson | |
| 2005/0033200 A1 | 2/2005 | Soehren et al. | |
| 2005/0125826 A1 | 6/2005 | Hunleth et al. | |
| 2005/0160813 A1 | 7/2005 | Imai | |
| 2005/0174324 A1 | 8/2005 | Liberty et al. | |
| 2005/0212767 A1 | 9/2005 | Marvit et al. | |
| 2005/0213840 A1 | 9/2005 | Chen | |
| 2005/0222784 A1 | 10/2005 | Tuff et al. | |
| 2005/0222802 A1 | 10/2005 | Tamura et al. | |
| 2005/0243061 A1 | 11/2005 | Liberty et al. | |
| 2005/0243062 A1 | 11/2005 | Liberty | |
| 2005/0253806 A1 | 11/2005 | Liberty et al. | |
| 2006/0028446 A1 | 2/2006 | Liberty et al. | |
| 2006/0092133 A1 | 5/2006 | Touma et al. | |
| 2006/0125789 A1 | 6/2006 | Tu et al. | |
| 2006/0150734 A1 | 7/2006 | Mimnagh-Kelleher et al. | |
| 2006/0262116 A1 | 11/2006 | Moshiri | |
| 2007/0035518 A1 | 2/2007 | Francz | |
| 2007/0066394 A1 | 3/2007 | Ikeda et al. | |
| 2007/0072680 A1 | 3/2007 | Ikeda | |
| 2008/0016962 A1 | 1/2008 | Dwyer et al. | |
| 2008/0024435 A1 | 1/2008 | Dohta | |
| 2008/0108870 A1 | 5/2008 | Wiita et al. | |
| 2008/0134784 A1 | 6/2008 | Jeng et al. | |
| 2009/0002203 A1 | 1/2009 | Kataoka | |

FOREIGN PATENT DOCUMENTS

| | | |
|---|---|---|
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 0919906 A2 | 6/1999 |
| GB | 591019 | 8/1947 |
| GB | 2284478 | 6/1995 |
| GB | 2307133 | 5/1997 |
| GB | 2316482 | 2/1998 |
| GB | 2319374 | 5/1998 |
| JP | 03-204844 | 9/1991 |
| JP | 03-059619 | 11/1991 |
| JP | 07-028591 | 1/1995 |
| JP | 07-146123 | 6/1995 |
| JP | 07-200142 | 8/1995 |
| JP | 2901476 A | 8/1995 |
| JP | 07-302148 | 11/1995 |
| JP | 3262677 | 11/1995 |
| JP | 07-318332 | 12/1995 |
| JP | 08034569 A | 2/1996 |
| JP | H08034569 | 2/1996 |
| JP | 08-095704 | 4/1996 |
| JP | 08-106352 | 4/1996 |
| JP | 08-114415 | 5/1996 |
| JP | 08-122070 | 5/1996 |
| JP | 3194841 A | 5/1996 |
| JP | 08-152959 | 6/1996 |
| JP | 3273531 A | 6/1996 |
| JP | 08-211993 | 8/1996 |
| JP | 3228845 A | 8/1996 |
| JP | 8-314625 A | 11/1996 |
| JP | 08-335136 | 12/1996 |
| JP | 3517482 A | 12/1996 |
| JP | 09-230997 | 9/1997 |
| JP | 09-274534 | 10/1997 |
| JP | 09-319510 | 12/1997 |
| JP | 10240434 A | 9/1998 |
| JP | H10240434 | 9/1998 |
| JP | 10-275048 A | 10/1998 |
| JP | 11-045150 A | 2/1999 |
| JP | H11-85387 A | 3/1999 |
| JP | 2000-270237 | 9/2000 |
| JP | 2000-308756 | 11/2000 |
| JP | 2001-175412 | 6/2001 |
| JP | 2001159951 A | 6/2001 |
| JP | 2000-56897 A | 2/2002 |
| JP | 2002-062981 A | 2/2002 |
| JP | 2002-091692 | 3/2002 |
| JP | 2002082773 A | 3/2002 |
| JP | 2002215327 A | 8/2002 |
| JP | 2002-312117 A | 10/2002 |
| JP | 2004-062774 | 2/2004 |
| JP | 2004-126756 A | 4/2004 |
| JP | 2006-113019 | 4/2006 |
| JP | 2007-86013 A | 4/2007 |
| KR | 200300009577 A | 2/2003 |
| NL | 9300171 | 8/1994 |
| RU | 2125853 C1 | 2/1999 |
| RU | 2126161 C1 | 2/1999 |
| RU | 2141738 C1 | 11/1999 |
| WO | 96/11435 A1 | 4/1996 |
| WO | 01/78055 | 10/2001 |
| WO | 03/048909 A2 | 6/2003 |
| WO | 2005/099166 A2 | 10/2005 |
| WO | 2007/007227 A2 | 1/2007 |

OTHER PUBLICATIONS

IEEE Standards, "802.16 IEEE Stand for Local and Metropolitan Area Networks, Part 16: Air Interface for Fixed Broadband Wireless Access Systems," IEEE Std. 802.16-2004, Oct. 1, 2004, pp. 1-857.

Ang, W.T., et al., "Physical Model of a MEMS Accelerometer for Low-g Motion Tracking Applications," Proceedings of the 2004 IEEE International Conference on Robotics & Automation, Apr. 2004, pp. 1345-1351.

Bachmann, E. R., "Inertial and Magnetic Tracking of Limb Segment Orientation for Inserting Humans into Synthetic Environments," Dissertation, Naval Postgraduate School, Monterey, California, Dec. 2000, pp. 1-178.

Bachmann, E. R., et al., "Orientation Tracking for Humans and Robots Using Inertial Sensors," IEEE International Symposium on Computational Intelligence in Robotics and Automation, CIRA '99 Proceedings, 1999, pp. 187-194.

Bachmann, E. R., et al. "Design and Implementation of MARG Sensors for 3-DOF Orientation Measurement of Rigid Bodies," IEEE International Conference on Robotics and Automation, ICRA '03, Sep. 2003, vol. 1, pp. 1171-1178.

(56) References Cited

OTHER PUBLICATIONS

Baerveldt, A-J, et al., "A Low-Cost and Low-Weight Attitude Estimation System for an Autonomous Helicopter," 1997 IEEE International Conference on Intelligent Engineering Systems, INES '97 Proceedings, Sep. 1997, pp. 391-395.
Barshan B., et al., "Inertial Navigational Systems for Mobile Robots," IEEE Transactions on Robotics and Automation, vol. 11, No. 3, Jun. 1995, pp. 328-342.
Bibi, F., et al., "Modeling and Simulation of Bias Uncertainty of Gyroscope for Improved Navigation," 2nd International Bhurban Conference on Applied Sciences and Technology, Bhurban, Pakistan, Jun. 16-21, 2003, pp. 1-9.
Blomster, J., "Orientation Estimation Combining Vision and Gyro Measurements," KTH Electrical Engineering, Master's Degree Project, Stockholm, Sweden, Apr. 6, 2006, pp. 1-44.
Choukroun, D., "Novel Methods for Attitude Determination Using Vector Observations," Research Thesis, Senate of the Technion-Israel Institute of Technology, May 2003, pp. 1-290.
Choukroun, D., et al., "A Novel Quaternion Kalman Filter," TAE No. 930, Faculty of Aerospace Engineering, Technion-Israel Institute of Technology, Jan. 2004, pp. 1-53.
Dogancay, K., "Bias Compensation for the Bearings-Only Pseudolinear Target Track Estimator," IEEE Transactions on Signal Processing, vol. 54, No. 1, Jan. 2006, pp. -59-68.
Foxlin, E., "Inertial Head-Tracker Sensor Fusion by a Complementary Separate-Bias Kalman Filter," Proceedings of the IEEE 1996 Virtual Reality Annual International Symposium, 1996, pp. 185-194, 267.
Foxlin, E., "Pedestrian Tracking with Shoe-Mounted Inertial Sensors," Computer Graphics and Applications, IEEE, vol. 25, No. 6, 2005, pp. 38-46.
Gebre-Egziabher, D., et al., "A Gryo-Free Quaternion-Based Attitude Determination System Suitable for Implementation Using Low Cost Sensors," Position Location and Navigation Symposium, IEEE, 2000, pp. 185-192.
Gripton, A., "The Application and Future Development of a MEMS SiVS for Commercial and Military Inertial Products," Position Location and Navigational Symposium, IEEE, 2002, pp. 28-35.
Hong, S., et al., "Observability of Error States in GPS/INS Integration," IEEE Transactions on Vehicular Technology, vol. 54, No. 2, Mar. 2005, pp. 731-743.
Mahony R., et al., "Complementary Filter Design on the Special Orthogonal Group SO(3)," 44th IEEE Conference on Decision and Control, and 2005 European Control Conference, CDC-ECC '05, Dec. 2005, pp. 1477-1484.
Kraft, E., "A Quaternion-based Unscented Kalman Filter for Orientation Tracking," Proceedings of the Sixth International Conference on Information Fusion, vol. 1. 2003, pp. 47-54.
Leavitt, J., et al., "High Bandwidth Tilt Measurement Using Low-Cost Sensors," IEEE/ASME Transactions on Mechatronics, vol. 11, No. 3, Jun. 2006, pp. 320-327.
Park, S., et al., "Examples of Estimation Filters from Recent Aircraft Projects at MIT," Nov. 2004, pp. 1-15.
Park, H.W., et al., "Covariance Analysis of Strapdown INS Considering Gyrocompass Characteristics," IEEE Transactions on Aerospace and Electronic Systems, vol. 31, No. 1, Jan. 1995, pp. 320-328.
Roumeliotis, S.I., et al., "Circumventing Dynamic Modeling: Evaluation of the Error-State Kalman Filter Applied to Mobile Robot Localization," 1999 IEEE International Conference Proceedings on Robotics and Automation, vol. 2, 1999, pp. 1656-1663.
Welch, G.F., "SCAAT: Incremental Tracking with Incomplete Information," Department of Computer Science, UNC-Chapel Hill, TR96-051, Oct. 1996, pp. 1-207.
Notice of Reasons for Rejection (Office Action) issued in corresponding Japanese Patent Application No. 2007-511071 on Jun. 9, 2009.
Notice of Preliminary Rejection (Office Action) issued in corresponding Korean Patent Application No. 10-2006-7025233 on Jun. 24, 2009.

Eibele et al., "Orientation as an additional User Interface in Mixed Reality Environments,1.," Workshop Erweiterte und Virtuelle Realitat, pp. 79-90, 2004.
Simon et al., "The Yo-Yo: A Handheld Device Combining Elastic and Isotonic Input," Human-Computer Interaction-Interact '03, pp. 303-310, 2003.
Analog Devices, Inc., Analog Devices Low-Cost +/−2g Dual Axis Accelerometer with Duty Cycle Output (ADXL202E), data sheet, 2000.
Appendices A, B and C from U.S. Patent No. 6,069,594 to Barnes et al., pp. 1-104, May 30, 2000.
Supplemental European Search Report for Application No. EP 05 74 4089, mailed Mar. 6, 2008.
Supplemental European Search Report for Application No. EP 05 76 1047, mailed Apr. 2, 2008.
Supplemental European Search Report for Application No. EP 05757855, mailed Apr. 10, 2008.
Strachan, S., et al., "Muscle Tremor as an Input Mechanism," UIST '04, XP002473042, Oct. 24-27, 2004, pp. 1-2.
International Search Report for International application No. PCT/US05/15051, mailed Feb. 19, 2008.
Written Opinion for International application No. PCT/US05/15051, mailed Feb. 19, 2008.
Office Action for Chinese Application No. 200580021163.7, mailed Jan. 25, 2008.
International Search Report for International application No. PCT/US05/42558, mailed Nov. 30, 2006.
Written Opinion for International application No. PCT/US05/42558, mailed Nov. 30, 2006.
Ang, W.T., et al., "Design and Implementation of Active Error Canceling in Hand-Held Microsurgical Instrument," Proceedings of the 2001 IEEE/RSJ International Conference on Intelligent Robots and Systems, vol. 2, Oct. 2001, pp. 1106-1111.
Ang, W.T., et al., "Design of All-Accelerometer Inertial Measurement Unit for Tremor Sensing in Hand Held Microsurgical Instrument," Proceedings of the 2003 IEEE International Conference on Robotics & Automation, Sep. 2003, pp. 1781-1786.
Jakubowski, J., et al., "Increasing Effectiveness of Human Hand Tremor Separation Process by Using Higher-Order Statistics," Measurement Science Review, vol. 1, No. 1, 2001, pp. 43-43.
Jakubowski, J., et al., "Higher Order Statistics and Neural Network for Tremor Recognition," IEEE Transactions on Biomedical Engineering, vol. 49, No. 2, Feb. 2002, pp. 152-159.
Raethjen, J., et al., "Tremor Analysis in Two Normal Cohorts," Clinical Neurophysiology 115, 2004, pp. 2151-2156.
Riviere, C.N., et al., "Adaptive Canceling of physiological Tremor for Improved Precision in Microsurgery," IEEE Transactions on Biomedical Engineering, vol. 45, No. 7, Jul. 1998, pp. 839-846.
Timmer, J., et al., "Characteristics of Hand Tremor Time Series," Biological Cybernetics, vol. 70, 1993, pp. 75-80.
Timmer, J., et al., "Cross-Spectral Analysis of Physiological Tremor and Muscle Activity: I Theory and application to Unsychronized Electromyogram," Biological Cybernetics, vol. 78, 1998, pp. 349-357.
Timmer, J., et al., "Cross-Spectral Analysis of Physiological Tremor and Muscle Activity: II Application to Sychronized Electromyogram," Biological Cybernetics, vol. 78, 1998, pp. 359-368.
Timmer, J., "Modeling Noisy Time Series: Physiological Tremor," International Journal of Bifurcation and Chaos, vol. 8, No. 7, 1998, pp. 1505-1516.
International Preliminary Report on Patentability Chapter 1 PCT/EP2009/057978, issued on Jan. 5, 2011.
Timmer, J., et al., "Cross-Spectral Analysis of Tremor Time Series," International Journal of Bifurcation and Chaos, vol. 10, No. 1, Mar. 2000, pp. 2595-2610.
Timmer, J., et al., "Pathological Tremors: Deterministic Chaos or Nonlinear Stochastic Oscillators?" Chaos, vol. 10, No. 1, Mar. 2000, pp. 278-288.
Digalakis, V., et al., "ML Estimation of a Stochastic Linear System with the EM Algorithm and Its Application to Speech Recognition," IEEE Transactions on Speech and Audio Processing, vol. 1, No. 4, Oct. 1993, pp. 431-442.

(56) References Cited

OTHER PUBLICATIONS

Haykin, S., et al., "Adaptive Tracking of Linear Time-Variant Systems by Extended RLS Algorithms," IEEE Transactions on Signal Processing, vol. 45, No. 5, May 1997, pp. 1118-1128.
La Scala, B. F., et al., "Design of an Extended Kalman Filter Frequency Tracker," IEEE Transactions on Signal Processing, vol. 44, No. 3, Mar. 1996, pp. 739-742.
Navarrete, P., et al., "Eigenspace-based Recognition of Faces: Comparisons and a New Approach," Image Analysis and Processing, 2001, pp. 1-6.
Liu, C., et al., "Enhanced Fisher Linear Discrimination Models for Face Recognition," Proc. 14th International Conference on Pattern Recognition, Queensland, Australia, Aug. 17-20, 1998, pp. 1-5.
International Search Report for International Application No. PCT/US05/15096, mailed May 15, 2006.
Written Opinion issued in International Application No. PCT/US05/15096, mailed May 15, 2006.
International Search Report issued in International application No. PCT/US04/35369, mailed May 11, 2006.
Written Opinion issued in International application No. PCT/US04/35369, mailed May 11, 2006.
Geen, J., et al., "New iMEMS Angular-Rate-Sensing Gyroscope," Analog Dialogue, 37-03 (2003), pp. 1-4.
Riviere, C.N., et al., "Toward Active Tremor Canceling in Handheld Microsurgical Instruments," IEEE Transactions on Robotics and Automation, vol. 19, No. 5, Oct. 2003, pp. 793-800.
Website: A. H. Sayed, "UCLA Adaptive Systems Laboratory-Home Page," UCLA, http://asl.ee.ucla.edu/index.php?option-com_frontpage&Itemid=1, retrieved Aug. 17, 2007, p. 1.
Supplemental European Search Report for Application No. EP 04 79 6360, mailed Apr. 2, 2008.
European Patent Office Communication for European Application No. 09 769 324.6 dated Sep. 11, 2012.
European Patent Office Communication for European Application No. 09 769 324.6 dated Apr. 28, 2011 comprising Third Party Observation dated Apr. 14, 2011.
Pancrotov, C. et al., "Why Computer Architecture Matters," Computing in Science and Engineering, IEEE Service Center, Los Alamitos, CA, US, vol. 10, No. 3, May 1, 2008, pp. 59-63, XP011207385.
Feltens, J., "Vector methods to compute azimuth, elevation, ellipsoidal normal, and the Cartesian (X, Y, Z) to geodetic (ø, λ, h) transformation," Journal of Geodesy; Berlin, DE, vol. 82, No. 8, Dec. 8, 2007, pp. 483-504, XP01962014.
Wikipedia, "List of trigonometric identities," Dec. 28, 2007, Retrieved from the Internet: URL:http://en.wikipedia.org/w/index.php?title=List_of_trigonometric_identities&oldid=180536783 [retrieved on Aug. 23, 2012], pp. 1-14.
Jurman, D., et al., "Calibration and data fusion solution for the miniature attitude and heading reference system," Sensors and Actuators, Lausanne, CH, vol. 138, No. 2, Aug. 15, 2007, pp. 411-420, XP022200001.
Request for Inter Partes Reexamination of U.S. Patent No. 7,158,118, filed with U.S. Patent and Trademark Office on Jul. 13, 2012.
Analog Devices, Inc., "ADXL202/ADXL210 Product Specification," 1999, Norwood, MA, USA.
Honeywell, Inc., Caruso, Michael J., "Applications of Magnetoresistive Sensors in Navigation Systems," SAE Technical Paper Series #970602, International Congress & Exposition, Feb. 24-27, 1997, Detroit, Michigan, USA.
Illinois State University, Friedberg, Stephen H., et al., "Linear Algebra, 4th Ed.," 2003, Pearson Education, Inc., Prentice Hall, Upper Saddle River, NJ, USA.
Ang, Wei Tech, et al., "Design of All-Accelerometer Inertial Measurement Unit for Tremor Sensing in Hand-Held Microsurgical Instrument," Jan. 1, 2003, Institute for Software Research, School of Computer Science, Paper 520 Pittsburgh, PA, USA.
Hamilton, W., "Lectures on Quaternions," Hodges and Smith, 1853, Entire Book, electronic.
Analog Devices ADXL330, "Small, Low Power, 3-Axis±3g iMEMS® Accelerometer," 2006, 16 pgs.
Analog Devices ADXL50, "Monolithic Accelerometer With Signal Conditioning," 1996, 16 pgs.
Answer of Nintendo Co., Ltd. and Nintendo of America Inc. to the Complaint of Hillcrest Laboratories, Inc., Under Section 337 of the Tariff Act of 1930, as Amended; United States International Trade Commission Investigation No. 337-TA-658; Oct. 20, 2008; 32 pgs.
Wilson, A., et al., "XWand: UI for Intelligent Spaces," CHI 2003, Apr. 5-10, 2003, 8 pgs.
Bowman, D. A., et al., "3D User Interfaces," User Interfaces Theory and Practice, Mar. 2004, pp. 1-182.
Card, S. K., et al., "The Design Space of Input Devices," CHI '90 Proceedings, Apr. 1990, pp. 117-124.
Caruso, M. J., et al; "Vehicle Detection and Compass Applications Using AMR Magnetic Sensors;" Proceedings Sensors Expo Baltimore; May 4-6, 1999; 14 pgs.
Ciciora, W., et al., "Modern Cable Television Technology; Video, Voice, and Data Communications," Morgan Kaufmann Publishers, Inc., 1999, Chapters 1, 7, 8, and 18-20, 193 pgs.
Clarendon Press Oxford, "The New Shorter Oxford English Dictionary on Historical Principles," vol. 1, A-M, 1993, pp. 286, 371, 372, 374, 2266-2268, 2371, 2542-2543, 1076.
Commission Investigative Staff's List of Admitted Exhibits (Public and Confidential); United States International Trade Commission Investigation No. 337-TA-658; Jul. 21, 2009; 6 pgs.
Commission Investigative Staff's Rebuttal Exhibit List; United States International Trade Commission Investigation No. 337-TA-658; Apr. 29, 2009; 3 pgs.
Commission Investigative Staff's Response to Motion by Donald S. Odell to Quash Subpoena Duces Tecum and Ad Testificandum; United States International Trade Commission Investigation No. 337-TA-658; Feb. 13, 2009; 7 pgs.
Commission Investigative Staff's Response to Motion of Nintendo Co., Ltd. and Nintendo of America Inc. for Leave to File Second Amended Answer to Complaint of Hillcrest Labaratories, Inc.; United States International Trade Commission Investigation No. 337-TA-658; Mar. 30, 2009; 5 pgs.
Commission Investigative Staff's Response to Respondent Nintendo's Motion for Summary Determination of Unpatentability of the '118, '760, and '611 Patents Under 35 U.S.C. § 101; United States International Trade Commission Investigation No. 337-TA-658; Mar. 4, 2009; 14 pgs.
Complainant's Combined List of Confidential and Public Exhibits Admitted or Rejected During the Evidentiary Hearing; United States International Trade Commission Investigation No. 337-TA-658; May 21, 2009; 15 pgs.
Complainant's List of Confidential Exhibits Admitted or Rejected During the Evidentiary Hearing; United States International Trade Commission Investigation No. 337-TA-658; May 21, 2009; 10 pgs.
Complainant's List of Public Exhibits Admitted or Rejected During the Evidentiary Hearing; United States International Trade Commission Investigation No. 337-TA-658; May 21, 2009; 9 pgs.
Day 1 Final Hearing Transcript; United States International Trade Commission Investigation No. 337-TA-658; May 11, 2009; 151 pgs.
Day 2 Final Hearing Transcript; United States International Trade Commission Investigation No. 337-TA-658; May 12, 2009; 309 pgs.
Day 3 Final Hearing Transcript; United States International Trade Commission Investigation No. 337-TA-658; May 13, 2009; 384 pgs.
Day 4 Final Hearing Transcript; United States International Trade Commission Investigation No. 337-TA-658; May 14, 2009; 578 pgs.
Day 5 Final Hearing Transcript; United States International Trade Commission Investigation No. 337-TA-658; May 15, 2009; 525 pgs.
Demonstratives submitted in United States International Trade Commission Investigation No. 337-TA-658; 2009; 30 pp.
Ex Parte Application for Issuance of Subpoena Duces Tecum and Ad Testificandum to Christopher Roller; United States International Trade Commission Investigation No. 337-TA-658; Sep. 18, 2008; 25 pp.
Flaherty, N., "Silicon Springs to Its Sensors," Electronics Times, Mar. 2, 1998, 2 pp.
Foley, J. D., et al., "Second Edition Computer Graphics Principles and Practice," Addison-Wesley Publishing Company, Nov. 1992, Chapters 1, 5, 7, Appendix, pp. 159.

(56) References Cited

OTHER PUBLICATIONS

Foxlin, E., et al., "Chapter 7. Motion Tracking Requirements and Technologies," Handbook of Virtual Environment Technology, 2002, 54 pp.
Hogue, A., "Marvin: A Mobile Automatic Realtime Visual and INertial Tracking System," Graduate Program in Computer Science York University, May 2003, 228 pp.
IBM, "Dictionary of Computing Information Processing, Personal Computing, Telecommunications, Office Systems, IBM-Specific Terms," 8th Edition, Mar. 1987, p. 475.
International Standard, "Information Technology—Vocabulary—Part 13: Computer Graphics," 2nd Edition, 1996; total 50 pp.
James D. Richards III's Response to Respondent's Motion to Certify to the Commission a Request for Judical Enforcement of a Subpoena Duces Tecum and Ad Testificandum Directed to James D. Richards III; United States International Trade Commission Investigation No. 337-TA-658; Mar. 20, 2009; 22 pp.
Joint Stipulation Regarding Technology At Issue; United States International Trade Commission Investigation No. 337-TA-658; May 11, 2008; 3 pp.
Joint Stipulation Regarding the Technology in Issue; United States International Trade Commission Investigation No. 337-TA-658; Feb. 23, 2009; 4 pp.
Karin J. Norton's Letter Re 2/18 and 20/2009 Motion; United States International Trade Commission Investigation No. 337-TA-658; Feb. 24, 2009; 141 pp.
Karush, W., Ph.D., "Webster's New World Dictionary of Mathematics," MacMillan, 1989, 7 pp.
Kevin B. Collins' Letter Withdrawing Feb. 17, 2009 Motion; United States International Trade Commission Investigation No. 337-TA-658; Feb. 20, 2009; 2 pp.
Lexisnexis, "Analog Devices Announces Two Design Wins for Versatile Micromachined Sensors," Feb. 25, 1999, 2 pp.
Lexisnexis, "Analog Devices Partners With Caveo Technology to Develop Next-Generation Security Technology for Laptop Computers," Aug. 17, 2000, 2 pp.
Lobo, J., et al., "Vision and Inertial Sensor Cooperation Using Gravity as a Vertical Reference," IEEE Transactions on Pattern Analysis and Machine Intelligence, vol. 25, No. 12, Dec. 2003, pp. 1597-1608.
McGraw-Hill, "Dictionary of Scientific and Technical Terms Fifth Edition," 1994, pp. 11, 12, 592, 1299, 1551, 1409, 2125.
Meyer, K., et al., "A Survey of Position Trackers," Communication Technology and Cognition Group, University of North Carolina; 1991, 67 pp.
Morrison, G., "ADI Debuts Accelerometer," Electronic News, Mar. 16, 1998, 2 pp.
Motion by Donald S. Odell to Quash Subpoena Duces Tecum and Ad Testificandum; United States International Trade Commission Investigation No. 337-TA-658; Feb. 6, 2009; 12 pp.
Motion by James D. Richards III to Quash Subpoena Duces Tecum and Ad Testificandum; United States International Trade Commission Investigation No. 337-TA-658; Jan. 21, 2009; 7 pp.
Motion of Nintendo Co., Ltd. and Nintendo of America Inc. for Leave to File Amended Answer to Complaint of Hillcrest Laboratories, Inc.; United States International Trade Commission Investigation No. 337-TA-658; Nov. 25, 2008; 36 pp.
Motion of Nintendo Co., Ltd. and Nintendo of America Inc. for Summary Determination of Unpatentability of the '118, '760, and '611 Patents Under 35 U.S.C. § 101; United States International Trade Commission Investigation No. 337-TA-658; Feb. 18, 2009; 134 pp.
Motion of Nintendo Co., Ltd. and Nintendo of America Inc. for Summary Determination of Unpatentability of the '118, '760, and '611 Patents Under 35 U.S.C. § 101; United States International Trade Commission Investigation No. 337-TA-658; Feb. 20, 2009; 34 pp.
O'Driscoll, G., "The Essential guide to Digital Set-top Boxes and Interactive TV," Prentice Hall PTR, Apr. 2000, Chapters 1, 2, 3, 6, 9, 10, 12; 141 pp.

Nintendo Co., Ltd., Presentation slides submitted in International Trade Commission Investigation No. 337-TA-658, 2009; 211 pp.
Order No. 13: Initial Determination Terminating the Investigation as to Certain Claims; United States International Trade Commission Investigation No. 337-TA-658; Feb. 23, 2009; 4 pp.
Order No. 14: Relating to Third-Party James D. Richards III's Motion No. 658-18 for Sanctions and for a New Protective Order and His Motion No. 658-13 to Quash Subpoena Duces Tecum and Ad Testificandum and Ordering Richards to Comply With Said Subpoena; United States International Trade Commission Investigation No. 337-TA-658; Feb. 27, 2009; 20 pp.
Order No. 19: Initial Determination Requesting Judicial Enforcement of Subpoena; United States International Trade Commission Investigation No. 337-TA-658; Mar. 23, 2009; 12 pp.
Order No. 25: Denying Respondent Nintendo's Motion for Summary Determination of Unpatentability of the '760, and '611, Patents Under 35 U.S.C. § 101; United States International Trade Commission Investigation No. 337-TA-658; Mar. 26, 2009; 12 pp.
Order No. 30: Denying Respondent's Motion to Stay; United States International Trade Commission Investigation No. 337-TA-658; Apr. 2, 2009; 10 pp.
Order No. 31: Granting Nintendo's Motion No. 658-37 to File Second Amended Answer to Complaint; United States International Trade Commission Investigation No. 337-TA-658; Apr. 2, 2009; 9 pp.
Order No. 37: Requiring Submissions From Complainant, Respondents and the Staff; United States International Trade Commission Investigation No. 337-TA-658; Apr. 23, 2009; 21 pp.
Order No. 39: Granting Complainant's Motion to Submit Riviere Supplemental Report; United States International Trade Commission Investigation No. 337-TA-658; Apr. 27, 2009; 3 pp.
Pique, M. E., "Semantics of Interactive Rotations," Interactive 3D Graphics, Oct. 23-24, 1986, pp. 259-269.
Planetmath.org, "Your Logo Here," Apr. 25, 2009, 3 pp.
Preliminary Conference; United States International Trade Commission Investigation No. 337-TA-658; Oct. 23, 2008; 114 pp.
Private Parties' Combined List of Confidential and Public Joint Exhibits Admitted or Rejected During the Evidentiary Hearing; United States International Trade Commission Investigation No. 337-TA-658; May 21, 2009; 9 pp.
Private Parties' List of Confidential Joint Exhibits Admitted or Rejected During the Evidentiary Hearing; United States International Trade Commission Investigation No. 337-TA-658; May 21, 2009; 7 pp.
Private Parties' List of Public Joint Exhibits Admitted or Rejected During the Evidentiary Hearing; United States International Trade Commission Investigation No. 337-TA-658; May 21, 2009; 7 pp.
Proposed Conclusions of Law of Respondents Nintendo Co., Ltd and Nintendo of America Inc.; United States International Trade Commission Investigation No. 337-TA-658; Jun. 3, 2009; 7 pp.
Respondents Nintendo Co., Ltd and Nintendo of America Inc.'s Unopposed Motion for Leave to File Supplemental Notice of Prior Art; United States International Trade Commission Investigation No. 337-TA-658; Feb. 6, 2009; 10 pp.
Respondents Nintendo Co., Ltd. and Nintendo of America Inc.'s Combined List of Confidential and Public Exhibits Admitted or Rejected During the Evidentiary Hearing; United States International Trade Commission Investigation No. 337-TA-658; May 21, 2009; 20 pp.
Respondents Nintendo Co., Ltd. and Nintendo of America Inc.'s Corrected Responses to Complainant Hillcrest Laboratories, Inc.'s Fourth Set of Interrogatories; United States International Trade Commission Investigation No. 337-TA-658; Feb. 18, 2009; 22 pp.
Respondents Nintendo Co., Ltd. and Nintendo of America Inc.'s List of Confidential Exhibits Admitted or Rejected During the Evidentiary Hearing; United States International Trade Commission Investigation No. 337-TA-658; May 21, 2009; 11 pp.
Respondents Nintendo Co., Ltd. and Nintendo of America Inc.'s List of Public Exhibits Admitted or Rejected During the Evidentiary Hearing; United States International Trade Commission Investigation No. 337-TA-658; May 21, 2009; 13 pp.

(56) References Cited

OTHER PUBLICATIONS

Respondents Nintendo Co., Ltd. and Nintendo of America Inc.'s Responses to Complainant Hillcrest Laboratories, Inc.'s Fourth Set of Interrogatories; United States International Trade Commission Investigation No. 337-TA-658; Feb. 17, 2009; 23 pp.

Respondents Nintendo Co., Ltd. and Nintendo of America Inc.'s Second Motion for Leave to Submit Supplemental Notice of Prior Art; United States International Trade Commission Investigation No. 337-TA-658; Feb. 24, 2009; 12 pp.

Respondents Nintendo Co., Ltd. and Nintendo of America Inc.'s Third Motion for Leave to Submit Supplemental Notice of Prior Art; United States International Trade Commission Investigation No. 337-TA-658; Mar. 17, 2009; 14 pp.

Sawada, K., et al., "A Wearable Attitude—Measurement System Using a Fiberoptic Gyroscope," Presence, vol. 11, No. 2, Apr. 2002, pp. 109-118.

Siggraph, Presentation slides submitted in United States International Trade Commission Investigation No. 337-TA-658; 2009; 103 pgs.

Rivastava, H. O., "Interactive TV Technology and Markets," 2002, Chapters 1, 2, 3, 7; 210 pgs.

ST, "MEMS Accelerometers," Apr. 29, 2009, pp. 2508-2511.

Stmicroelectronics LIS3L02AL, "Mems Inertial Sensor: 3-axis—+/−2g Ultracompact Linear Accelerometer," Sep. 2005, 17 pgs.

Stmicroelectronics LIS3L02ALE, "Mems Inertial Sensor: 3-axis—+/−2g Ultracompact Linear Accelerometer," Feb. 2006, 14 pgs.

Tech Infobase, "ADI Advances Tilt/Motion Sensing and System Hardware Monitoring.," Oct. 1, 2000, 9 pgs.

Telephone Conference; United States International Trade Commission Investigation No. 337-TA-658; Mar. 9, 2009; 61 pgs.

Titterton, D. H., et al., "Strapdown Inertial Navigation Technology," IEE Radar, Sonar, Navigation and Avionics Series 5, 1997, Chapters 1, 2, 3, and 10; 52 pgs.

U.S. Appl. No. 60/355,368, filed Feb. 7, 2002.

Utility U.S. Appl. No. 11/285,702, filed Nov. 23, 2005; 232 pp.—File History.

Vane, E. T., et al., "The Marketplace: Part II," Programming for TV, Radio, and Cable, 1994, pp. 29-46.

Vogel, D., et al., "Distant Freehand Pointing and Clicking on Very Large, High Resolution Displays," UIST '05, Department of Computer Science University of Toronto, Oct. 23-27, 2005, pp. 33-42.

Wilson, A. D., et al., "Demonstration of the XWand Interface for Intelligent Spaces," Microsoft Research, 2002, 2 pgs.

Wilson, A., "XWand: UI for Intelligent Environments," http://research.microsoft.com/en-us/um/people/awilson/wand/default.htm, Apr. 26, 2004, 5 pgs.

Wilson, D., et al., "Gesture Recognition Using the XWand," Apr. 2004, 10 pgs.

U.S. Appl. No. 60/641,410 filed Jan. 5, 2005.

European Search Report issued in corresponding European Application No. EP 10011316, dated Nov. 30, 2010.

Office Action issued in corresponding Japanese application No. 2007-511065, mailed Oct. 11, 2011.

International Search Report issued in corresponding International application No. PCT/US05/15068 mailed Jun. 14, 2006.

Written Opinion issued in corresponding International application No. PCT/US05/15068, mailed Jun. 14, 2006.

Nishiyama, K., "Robust Estimation of a Single Complex Sinusoid in White Noise—H∞ Filtering Approach," IEEE Transactions on Signal Processing, vol. 47, No. 10, Oct. 1999, pp. 2853-2856.

Nishiyama, K., "A Nonlinear Filter for Estimating a Sinusoidal Signal and its Parameters in White Noise: On the Case of a Single Sinusoid," IEEE Transactions on Signal Processing, vol. 45, No. 4, Apr. 1997, pp. 970-981.

Widrow, B., et al., "Fundamental Relations Between the LMS Algorithm and the DFT," IEEE Transactions on Circuits and Systems, vol. 34, No. CAS-7, Jul. 1987, pp. 814-820.

Sayed, A. H., "A Framework for State-Space Estimation with Uncertain Models," IEEE Transactions on Automatic Control, vol. 46, No. 7, Jul. 2001, pp. 998-1013.

Website: J. Timmer, "Data Analysis and Modeling of Dynamic Processes in the Life Sciences," Freiburg Center for Data Analysis and Modeling, http://webber.physik.uni-freiburg.de/~jeti/, retrieved Aug. 17, 2007, pp. 1-2.

Website: "Freiburg Center for Data Analysis and Modeling—Publications," http://www.fdm.uni-freiburg.de/cms/puplications/publications/, retrieved Aug. 17, 2007, pp. 1-11.

Website: C. Riviere, Robotics Institute, http://www.ri.cmu.edu/people/riviere_cameron.html, retrieved Aug. 17, 2007, pp. 1-4.

Website: A. Beuter, Publications, University of Quebec at Montreal, http://www.er.uqam.ca/nobel/r11040/publicat.htm, retrieved Aug. 17, 2007, pp. 1-7.

Website: R. Murray-Smith, Hamilton Institute, http://www.dcs.gla.ac.uk/~rod/, retrieved Aug. 17, 2007, pp. 1-5.

Website: Z. Jian, et al., "Adaptive Noise Cancellation," Rice University, http://www.ece.rice.edu/~klwang/elec434/elec434.htm, retrieved Aug. 17, 2007, pp. 1-6.

Japanese Notice of Allowance mailed Nov. 17, 2014 for related application No. JP 2012-126909.

* cited by examiner

3D POINTING DEVICES WITH ORIENTATION COMPENSATION AND IMPROVED USABILITY

RELATED APPLICATIONS

This application is a continuation of application Ser. No. 13/304,854, filed on Nov. 28, 2011, which is a continuation of application Ser. No. 12/188,595, filed on Aug. 8, 2008 and which issued on Dec. 6, 2011 as U.S. Pat. No. 8,072,424, which is a continuation of application Ser. No. 11/820,517, filed on Jun. 20, 2007 and which issued on Aug. 19, 2008 as U.S. Pat. No. 7,414,611, which is a continuation of application Ser. No. 11/640,677, filed Dec. 18, 2006 and which issued on Aug. 28, 2007 as U.S. Pat. No. 7,262,760, which is a continuation of application Ser. No. 11/119,719, filed May 2, 2005 and which issued on Jan. 2, 2007 as U.S. Pat. No. 7,158,118, which is related to, and claims priority from, U.S. Provisional Patent Application Ser. No. 60/566,444 filed on Apr. 30, 2004, entitled "Freespace Pointing Device", the disclosure of which is incorporated here by reference. This application is also related to, and claims priority from, U.S. Provisional Patent Application Ser. No. 60/612,571, filed on Sep. 23, 2004, entitled "Free Space Pointing Devices and Methods", the disclosure of which is incorporated here by reference. This application is also related to, and claims priority from, U.S. Provisional Patent Application Ser. No. 60/641,410, filed on Jan. 5, 2005, entitled "Freespace Pointing Devices and Methods for Using Same", the disclosure of which is incorporated here by reference. This application is also related to U.S. patent application Ser. Nos. 11/119,987, 11/119,688, and 11/119,663, entitled "Methods and Devices for Removing Unintentional Movement in 3D Pointing Devices", "Methods and Devices for Identifying Users Based on Tremor", and "3D Pointing Devices and Methods", all of which were filed concurrently with application Ser. No. 11/119,719 on May 2, 2005, and all of which are incorporated here by reference.

BACKGROUND

The present invention relates generally to handheld, pointing devices and, more specifically to three-dimensional (hereinafter "3D") pointing devices and techniques for tilt compensation and improved usability associated therewith.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straight-forward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Of particular interest for this specification are the remote devices usable to interact with such frameworks, as well as other applications and systems. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. Pat. No. 5,440,326.

The '326 patent describes, among other things, a vertical gyroscope adapted for use as a pointing device for controlling the position of a cursor on the display of a computer. A motor at the core of the gyroscope is suspended by two pairs of orthogonal gimbals from a hand-held controller device and nominally oriented with its spin axis vertical by a pendulous device. Electro-optical shaft angle encoders sense the orientation of a hand-held controller device as it is manipulated by a user and the resulting electrical output is converted into a format usable by a computer to control the movement of a cursor on the screen of the computer display.

However, the freedom of use associated with 3D pointers creates additional challenges. For example, since there is generally no proxy surface on which a 3D pointing device rests, the orientation of the handheld control device may vary considerably from user to user or even use to use. If a 3D pointing device is used to, for example, control the movement of a cursor displayed on a screen, then some mapping is performed between the detected movement of the handheld device and the movement of the cursor on the screen.

One technique for performing this mapping is to use the body frame of the device as the frame of reference for mapping detected motion of the 3D pointing device into intended motion of the cursor. The term "body frame" refers to a set of axes associated with the body of the object being moved as described in more detail below. Using the body frame of reference to perform the mapping, however, has certain drawbacks. For example, it requires the user to hold the device in a certain orientation in order to obtain the cursor movement he or she desires. For example, if the user holds the device on its side and moves the device left to right, the cursor will move vertically, not horizontally, on the screen.

Accordingly, the present invention describes methods and devices for processing the data received from sensor(s) in a manner which addresses these and other problems associated with conventional 3D pointing devices.

SUMMARY

Systems and methods according to the present invention describe 3D pointing devices which enhance usability by transforming sensed motion data from a first frame of reference (e.g., the body of the 3D pointing device) into a second frame of reference (e.g., a user's frame of reference). One exemplary embodiment of the present invention removes effects associated with a tilt orientation in which the 3D pointing device is held by a user.

According to an exemplary embodiment of the present invention, a handheld, pointing device includes a first rotational sensor for determining rotation of the pointing device about a first axis and generating a first rotational output associated therewith, a second rotational sensor for determining rotation of the pointing device about a second axis and generating a second rotational output associated therewith, an accelerometer for determining an acceleration of the pointing device and outputting an acceleration output associated therewith and a processing unit for receiving the first and second rotational outputs and the acceleration output and for: (a) converting the first and second rotational outputs and the acceleration output from a body frame of reference associated with the handheld pointing device into a user's frame of reference in order to remove the effects of tilt associated with the manner in which a user is holding the handheld, pointing device; and (b) determining data associated with x and y coordinates which are in turn associated with movement of a screen cursor, the data based on the converted first and second rotational outputs and the converted acceleration output, wherein the step of converting renders the movement of the screen cursor substantially independent of an orientation in which a user holds the handheld device.

According to another exemplary embodiment of the present invention, a method for using a 3D pointing device includes the steps of detecting movement of the 3D pointing device and compensating the detected movement by transforming the detected movement from a body frame of reference associated with the 3D pointing device into an inertial frame of reference.

According to yet another exemplary embodiment of the present invention, a 3D, handheld device includes at least one sensor for detecting movement of the 3D pointing device and a processing unit for compensating the detected movement by transforming the detected movement from a body frame of reference associated with the 3D pointing device into an inertial frame of reference.

BRIEF DESCRIPTION OF THE DRAWINGS

The accompanying drawings illustrate exemplary embodiments of the present invention, wherein.

DETAILED DESCRIPTION

Figure 1:
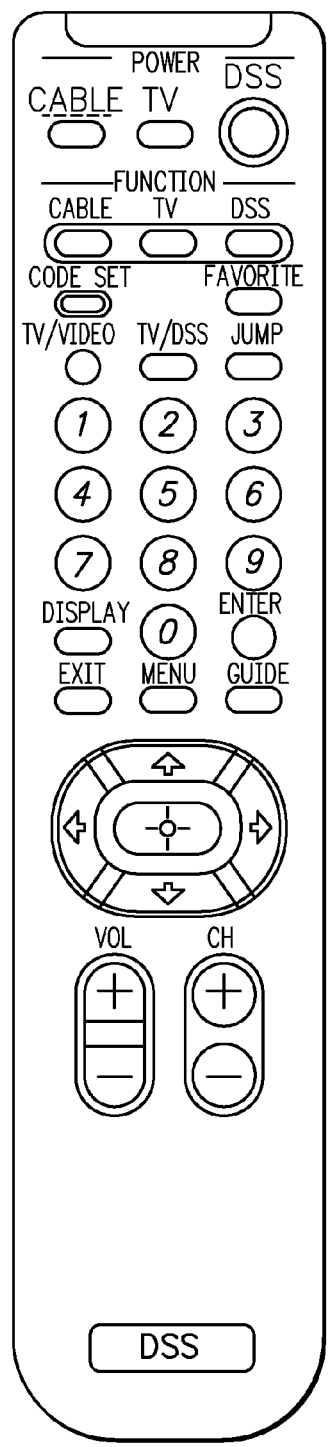
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 in which the present invention can be implemented will first be described with respect to FIG. 2. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a 3D pointing device according to one of the exemplary embodiments described below. The wireless I/O control device 226 can communicate with the entertainment system 200 using, e.g., an IR or RF transmitter or transceiver. Alternatively, the I/O control device can be connected to the entertainment system 200 via a wire.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 2, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

Figure 2:
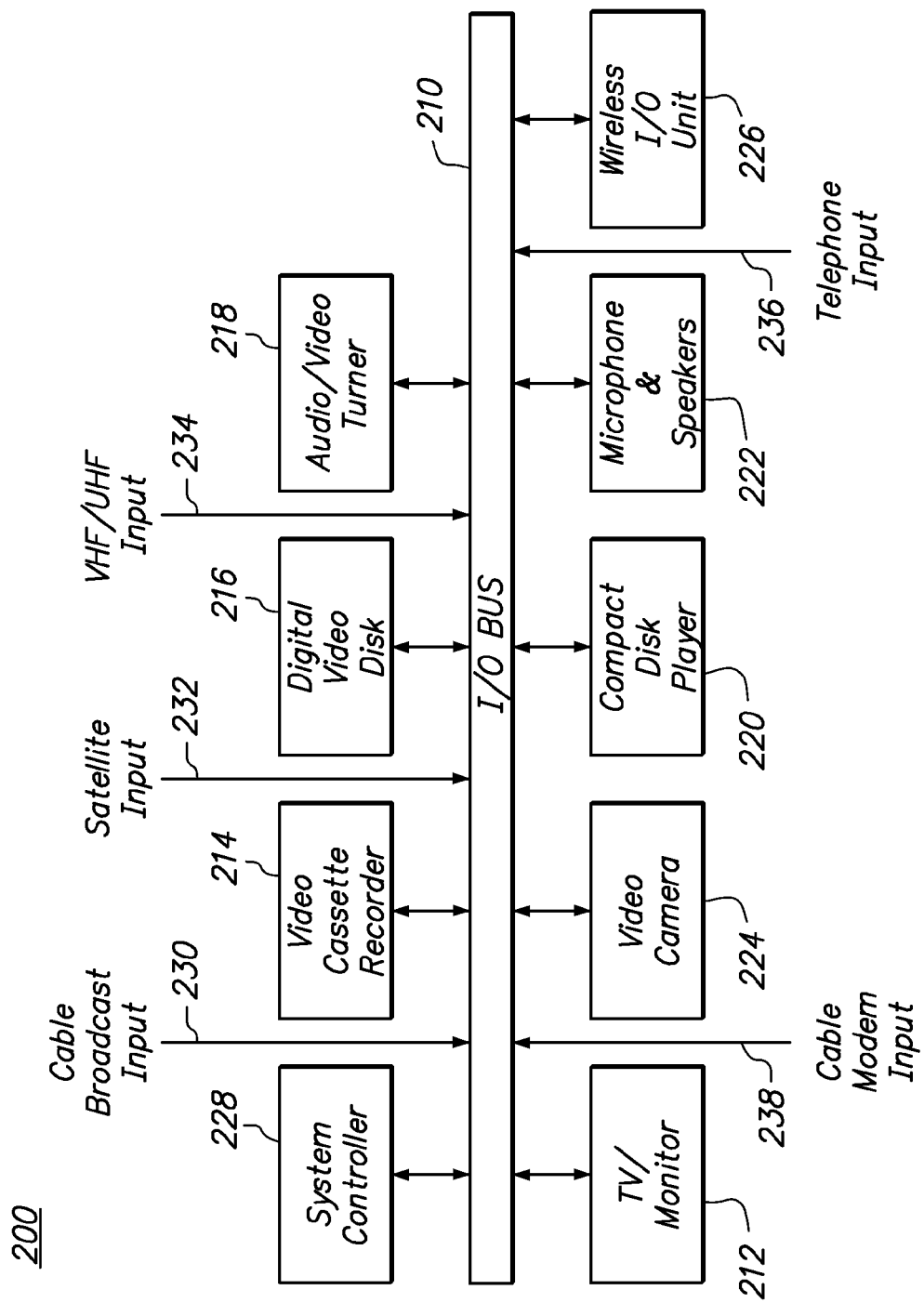
FIG. 2 depicts an exemplary media system in which exemplary embodiments of the present invention can be implemented.

As further illustrated in FIG. 2, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 2 are purely exemplary and that media system 200 may include more or fewer of both. For example, other types of inputs to the system include AM/FM radio and satellite radio.

More details regarding this exemplary entertainment system and frameworks associated therewith can be found in the above-incorporated by reference U.S. Patent Application "A Control Framework with a Zoomable Graphical User Interface for Organizing, Selecting and Launching Media Items". Alternatively, remote devices in accordance with the present invention can be used in conjunction with other systems, for example computer systems including, e.g., a display, a processor and a memory system or with various other systems and applications.

Figure 3:
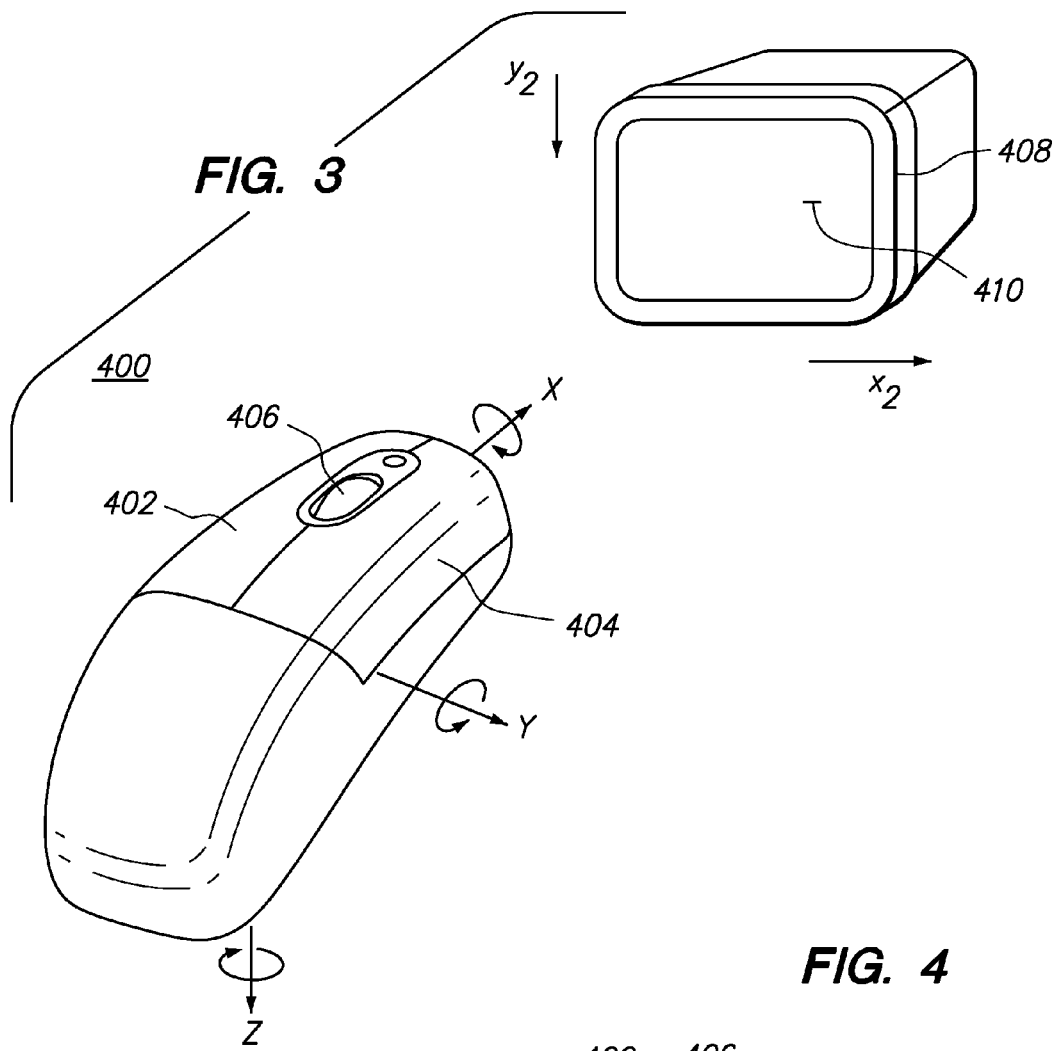
FIG. 3 shows a 3D pointing device according to an exemplary embodiment of the present invention.

As mentioned in the Background section, remote devices which operate as 3D pointers are of particular interest for the present specification. Such devices enable the translation of movement, e.g., gestures, into commands to a user interface. An exemplary 3D pointing device 400 is depicted in FIG. 3. Therein, user movement of the 3D pointing can be defined, for example, in terms of a combination of x-axis attitude (roll), y-axis elevation (pitch) and/or z-axis heading (yaw) motion of the 3D pointing device 400. In addition, some exemplary embodiments of the present invention can also measure linear movement of the 3D pointing device 400 along the x, y, and z axes to generate cursor movement or other user interface commands. In the exemplary embodiment of FIG. 3, the 3D pointing device 400 includes two buttons 402 and 404 as well as a scroll wheel 406, although other exemplary embodiments will include other physical configurations. According to exemplary embodiments of the present invention, it is anticipated that 3D pointing devices 400 will be held by a user in front of a display 408 and that motion of the 3D pointing device 400 will be translated by the 3D pointing device into output which is usable to interact with the information displayed on display 408, e.g., to move the cursor 410 on the display 408. For example, rotation of the 3D pointing device 400 about the y-axis can be sensed by the 3D pointing device 400 and translated into an output usable by the system to move cursor 410 along the $y_2$ axis of the display 408. Likewise, rotation of the 3D pointing device 408 about the z-axis can be sensed by the 3D pointing device 400 and translated into an output usable by the system to move cursor 410 along the $x_2$ axis of the display 408. It will be appreciated that the output of 3D pointing device 400 can be used to interact with the display 408 in a number of ways other than (or in addition to) cursor movement, for example it can control cursor fading, volume or media transport (play, pause, fast-forward and rewind). Input commands may include operations in addition to cursor movement, for example, a zoom in or zoom out on a particular region of a display. A cursor may or may not be visible. Similarly, rotation of the 3D pointing device 400 sensed about the x-axis of 3D pointing device 400 can be used in addition to, or as an alternative to, y-axis and/or z-axis rotation to provide input to a user interface.

Figure 4:
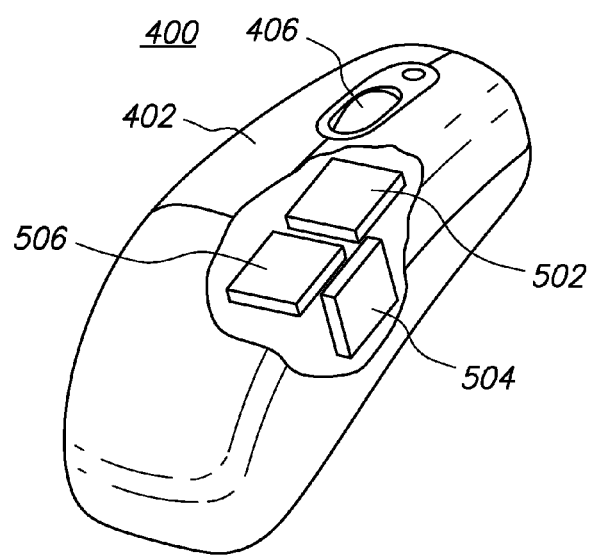
FIG. 4 illustrates a cutaway view of the 3D pointing device in FIG. 3 including two rotational sensors and one accelerometer.

According to one exemplary embodiment of the present invention, two rotational sensors 502 and 504 and one accelerometer 506 can be employed as sensors in 3D pointing device 400 as shown in FIG. 4. The rotational sensors 502 and 504 can, for example, be implemented using ADXRS150 or ADXRS401 sensors made by Analog Devices. It will be appreciated by those skilled in the art that other types of rotational sensors can be employed as rotational sensors 502 and 504 and that the ADXRS150 and ADXRS401 are purely used as an illustrative example. Unlike traditional gyroscopes, the ADXRS150 rotational sensors use MEMS technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors 502 and 504 have a single sensing axis (as for example the ADXRS150s), then they can be mounted in the 3D pointing device 400 such that their sensing axes are aligned with the rotations to be measured. For this exemplary embodiment of the present invention, this means that rotational sensor 504 is mounted such that its sensing axis is parallel to the y-axis and that rotational sensor 502 is mounted such that its sensing axis is parallel to the z-axis as shown in FIG. 4. Note, however, that aligning the sensing axes of the rotational sensors 502 and 504 parallel to the desired measurement axes is not required since exemplary embodiments of the present invention also provide techniques for compensating for offset between axes.

One challenge faced in implementing exemplary 3D pointing devices 400 in accordance with the present invention is to employ components, e.g., rotational sensors 502 and 504, which are not too costly, while at the same time providing a high degree of correlation between movement of the 3D pointing device 400, a user's expectation regarding how the user interface will react to that particular movement of the 3D pointing device and actual user interface performance in response to that movement. For example, if the 3D pointing device 400 is not moving, the user will likely expect that the cursor ought not to be drifting across the screen. Likewise, if the user rotates the 3D pointing device 400 purely around the y-axis, she or he would likely not expect to see the resulting cursor movement on display 408 contain any significant $x_2$ axis component. To achieve these, and other, aspects of exemplary embodiments of the present invention, various measurements and calculations are performed by the handheld device 400 which are used to adjust the outputs of one or more of the sensors 502, 504 and 506 and/or as part of the input used by a processor to determine an appropriate output for the user interface based on the outputs of the sensors 502, 504 and 506. These measurements and calculations are used to compensate for factors which fall broadly into two categories: (1) factors which are intrinsic to the 3D pointing device 400, e.g., errors associated with the particular sensors 502, 504 and 506 used in the device 400 or the way in which the sensors are mounted in the device 400 and (2) factors which are not intrinsic to the 3D pointing device 400, but are instead associated with the manner in which a user is using the 3D pointing device 400, e.g., linear acceleration, tilt and tremor. Exemplary techniques for handling each of these effects are described below.

Figure 5:
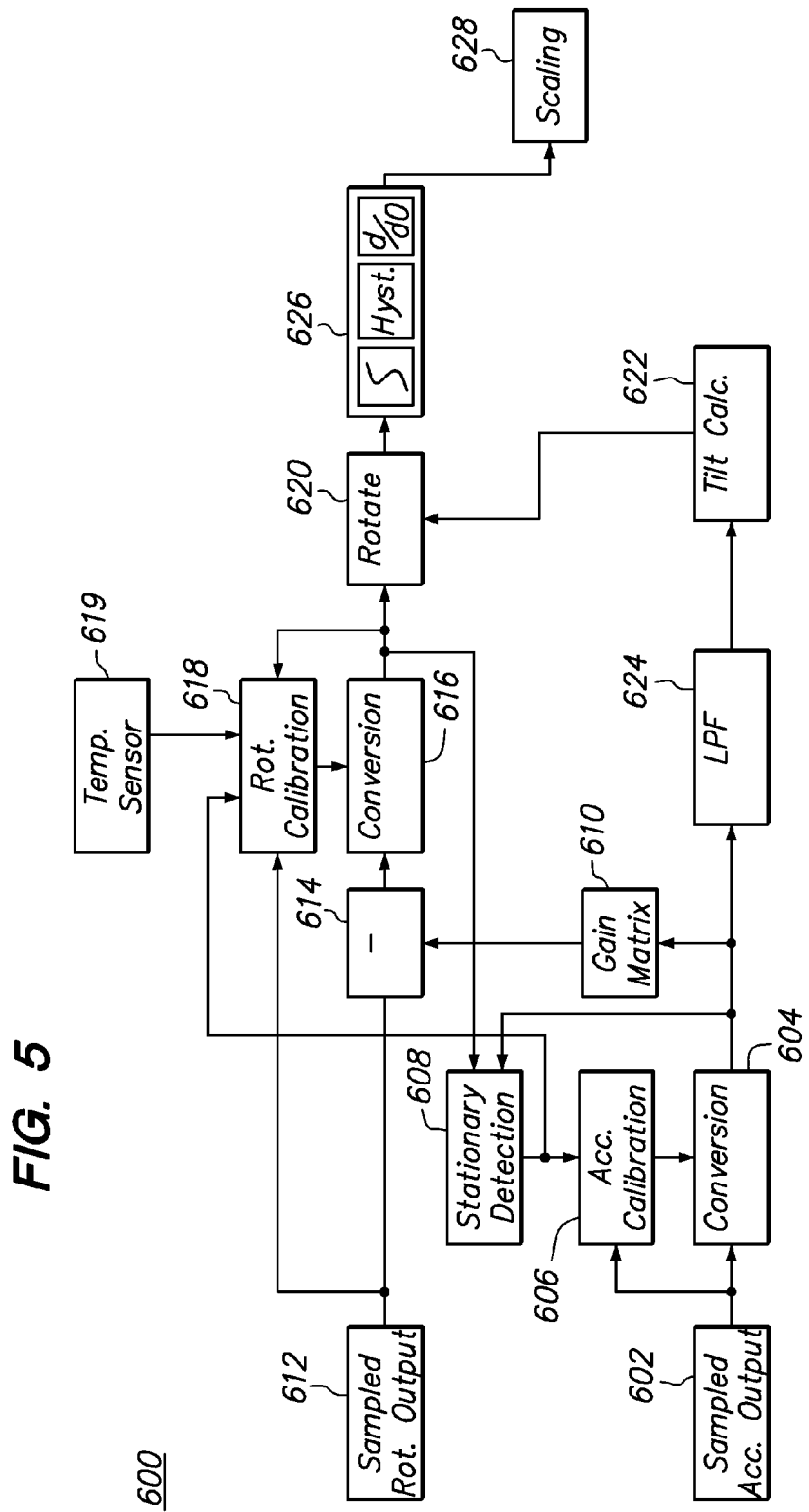
FIG. 5 is a block diagram illustrating processing of data associated with 3D pointing devices according to an exemplary embodiment of the present invention.
Figure 6A:
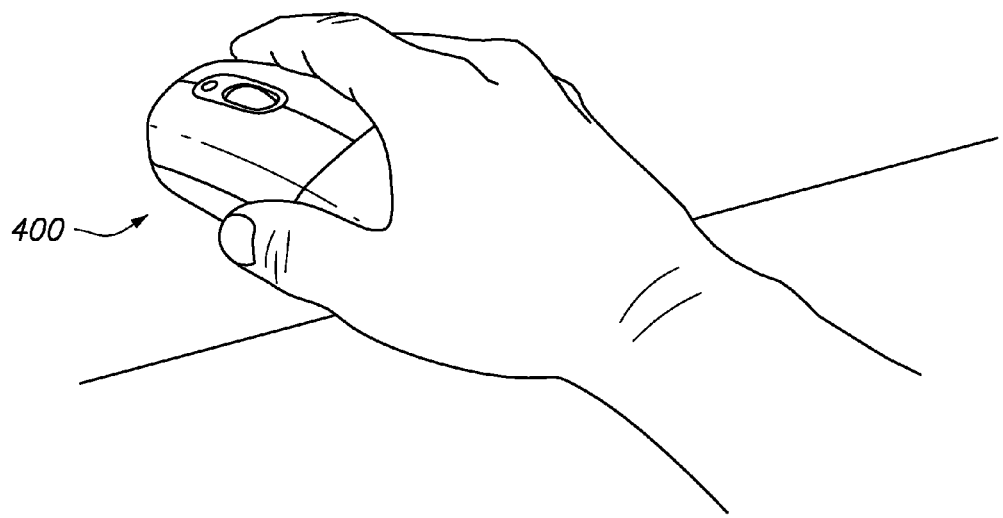
FIGS. 6(a)-6(d) illustrate the effects of tilt.
Figure 6B:
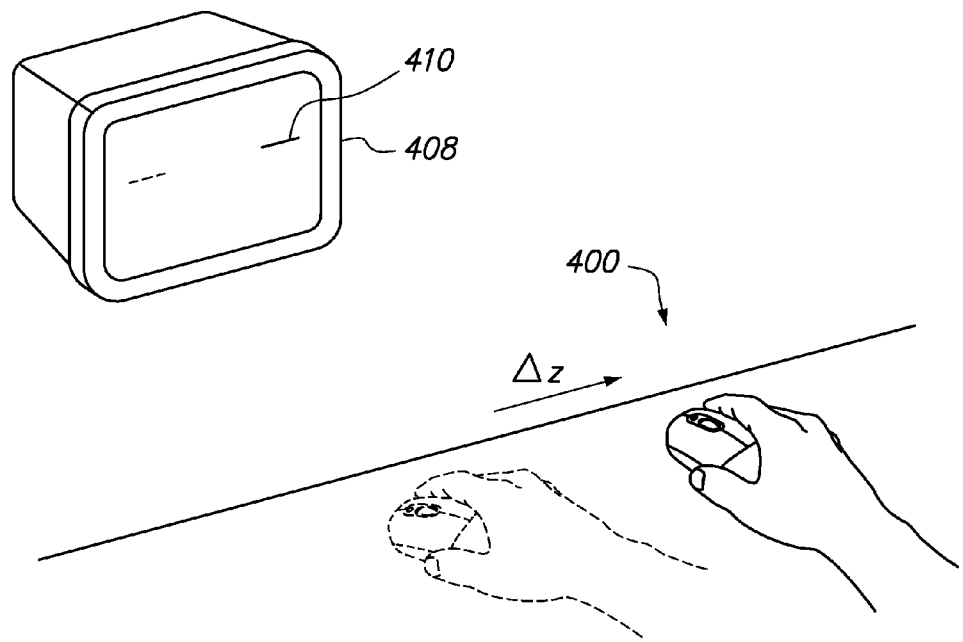
Figure 6C:
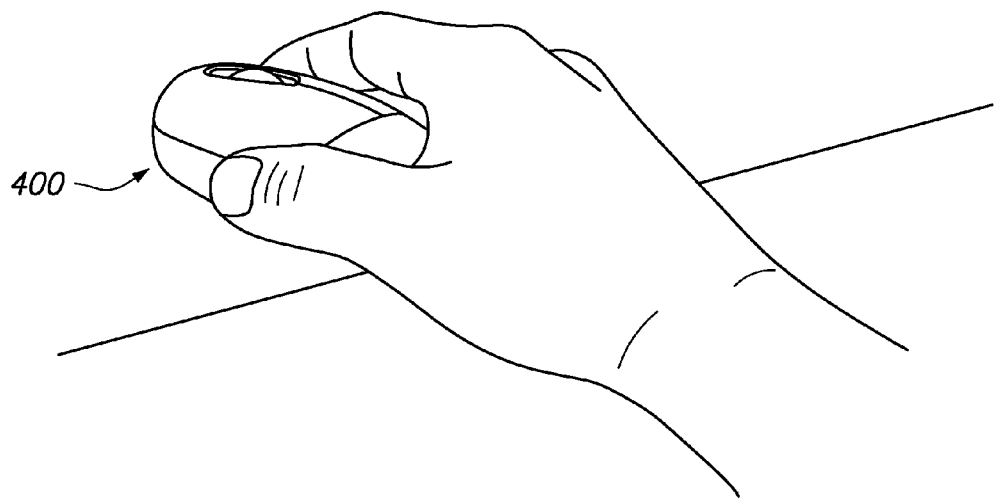
Figure 6D:
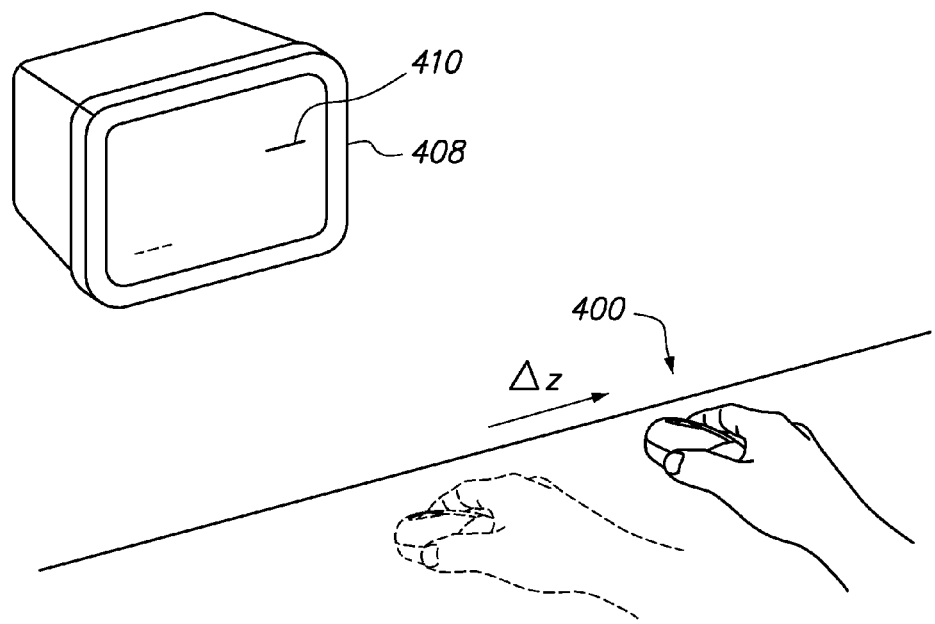

A process model 600 which describes the general operation of 3D pointing devices according to exemplary embodiments of the present invention is illustrated in FIG. 5. The rotational sensors 502 and 504, as well as the accelerometer 506, produce analog signals which are sampled periodically, e.g., 200 samples/second. For the purposes of this discussion, a set of these inputs shall be referred to using the notation (x, y, z, αy, αz), wherein x, y, z are the sampled output values of the exemplary three-axis accelerometer 506 which are associated with acceleration of the 3D pointing device in the x-axis, y-axis and z-axis directions, respectively, αy is a the sampled output value from rotational sensor 502 associated with the rotation of the 3D pointing device about the y-axis and αz is the sampled output value from rotational sensor 504 associated with rotation of the 3D pointing device 400 about the z-axis.

The output from the accelerometer 506 is provided and, if the accelerometer 506 provides analog output, then the output is sampled and digitized by an A/D converter (not shown) to generate sampled accelerometer output 602. The sampled output values are converted from raw units to units of acceleration, e.g., gravities (g), as indicated by conversion function 604. The acceleration calibration block 606 provides the values used for the conversion function 604. This calibration of the accelerometer output 602 can include, for example, compensation for one or more of scale, offset and axis misalignment error associated with the accelerometer 506. Exemplary conversions for the accelerometer data can be performed using the following equation:

$$A = S*((M-P).*G(T)) \quad (1)$$

wherein M is a 3×1 column vector composed of the sampled output values (x, y, z), P is a 3×1 column vector of sensor offsets, and S is a 3×3 matrix that contains both scale, axis misalignment, and sensor rotation compensation. G(T) is a gain factor that is a function of temperature. The "*" operator represents matrix multiplication and the ".*" operator represents element multiplication. The exemplary accelerometer 506 has an exemplary full range of +/−2 g. Sensor offset, P, refers to the sensor output, M, for an accelerometer measurement of 0 g. Scale refers to the conversion factor between the sampled unit value and g. The actual scale of any given accelerometer sensor may deviate from these nominal scale values due to, e.g., manufacturing variances. Accordingly the scale factor in the equations above will be proportional to this deviation.

Accelerometer 506 scale and offset deviations can be measured by, for example, applying 1 g of force along one an axis and measuring the result, R1. Then a −1 g force is applied resulting in measurement R2. The individual axis scale, s, and the individual axis offset, p, can be computed as follows:

$$s = (R1-R2)/2 \quad (2)$$

$$p = (R1+R2)/2 \quad (3)$$

In this simple case, P is the column vector of the p for each axis, and S is the diagonal matrix of the 1/s for each axis.

However, in addition to scale and offset, readings generated by accelerometer 506 may also suffer from cross-axes effects. Cross-axes effects include non-aligned axes, e.g., wherein one or more of the sensing axes of the accelerometer 506 as it is mounted in the 3D pointing device 400 are not aligned with the corresponding axis in the inertial frame of reference, or mechanical errors associated with the machining of the accelerometer 506 itself, e.g., wherein even though the axes are properly aligned, a purely y-axis acceleration force may result in a sensor reading along the z-axis of the accelerometer 506. Both of these effects can also be measured and added to the calibration performed by function 606.

The accelerometer 506 serves several purposes in exemplary 3D pointing devices according to exemplary embodiments of the present invention. For example, if rotational sensors 502 and 504 are implemented using the exemplary Coriolis effect rotational sensors described above, then the output of the rotational sensors 502 and 504 will vary based on the linear acceleration experienced by each rotational sensor. Thus, one exemplary use of the accelerometer 506 is to compensate for fluctuations in the readings generated by the rotational sensors 502 and 504 which are caused by variances in linear acceleration. This can be accomplished by multiplying the converted accelerometer readings by a gain matrix 610 and subtracting (or adding) the results from (or to) the corresponding sampled rotational sensor data 612. For example, the sampled rotational data αy from rotational sensor 502 can be compensated for linear acceleration at block 614 as:

$$\alpha y' = \alpha y - C*A \quad (4)$$

wherein C is the 1×3 row vector of rotational sensor susceptibility to linear acceleration along each axis given in units/g and A is the calibrated linear acceleration. Similarly, linear acceleration compensation for the sampled rotational data αz from rotational sensor 504 can be provided at block 614. The gain matrices, C, vary between rotational sensors due to manufacturing differences. C may be computed using the average value for many rotational sensors, or it may be custom computed for each rotational sensor.

Like the accelerometer data, the sampled rotational data 612 is then converted from a sampled unit value into a value associated with a rate of angular rotation, e.g., radians/s, at function 616. This conversion step can also include calibration provided by function 618 to compensate the sampled rotational data for, e.g., scale and offset. Conversion/calibration for both αy and αz can be accomplished using, for example, the following equation:

$$\alpha rad/s = (\alpha'-\text{offset}(T))*\text{scale}+d\text{Offset} \quad (5)$$

wherein α' refers to the value being converted/calibrated, offset(T) refers to an offset value associated with temperature, scale refers to the conversion factor between the sampled unit value and rad/s, and dOffset refers to a dynamic offset value. Equation (5) may be implemented as a matrix equation in which case all variables are vectors except for scale. In matrix equation form, scale corrects for axis misalignment and rotational offset factors. Each of these variables is discussed in more detail below.

The offset values offset(T) and dOffset can be determined in a number of different ways. When the 3D pointing device 400 is not being rotated in, for example, the y-axis direction, the sensor 502 should output its offset value. However, the offset can be highly affected by temperature, so this offset value will likely vary. Offset temperature calibration may be performed at the factory, in which case the value(s) for offset (T) can be preprogrammed into the handheld device 400 or, alternatively, offset temperature calibration may also be learned dynamically during the lifetime of the device. To accomplish dynamic offset compensation, an input from a temperature sensor 619 is used in rotation calibration function 618 to compute the current value for offset(T). The offset(T) parameter removes the majority of offset bias from the sensor readings. However, negating nearly all cursor drift at zero movement can be useful for producing a high-performance pointing device. Therefore, the additional factor dOffset, can be computed dynamically while the 3D pointing device 400 is in use. The stationary detection function 608 determines when the handheld is most likely stationary and when the offset should be recomputed. Exemplary techniques for implementing stationary detection function 608, as well as other uses therefore, are described below.

An exemplary implementation of dOffset computation employs calibrated sensor outputs which are low-pass filtered. The stationary output detection function 608 provides an indication to rotation calibration function 618 to trigger computation of, for example, the mean of the low-pass filter output. The stationary output detection function 608 can also control when the newly computed mean is factored into the existing value for dOffset. Those skilled in the art will recognize that a multitude of different techniques can be used for computing the new value for dOffset from the existing value of dOffset and the new mean including, but not limited to, simple averaging, low-pass filtering and Kalman filtering. Additionally, those skilled in the art will recognize that numerous variations for offset compensation of the rotational sensors 502 and 504 can be employed. For example, the offset(T) function can have a constant value (e.g., invariant with temperature), more than two offset compensation values can be used and/or only a single offset value can be computed/used for offset compensation.

After conversion/calibration at block 616, the inputs from the rotational sensors 502 and 504 can be further processed to rotate those inputs into an inertial frame of reference, i.e., to compensate for tilt associated with the manner in which the user is holding the 3D pointing device 400, at function 620. Tilt correction is another significant aspect of some exemplary embodiments of the present invention as it is intended to compensate for differences in usage patterns of 3D pointing devices according to the present invention. More specifically, tilt correction according to exemplary embodiments of the present invention is intended to compensate for the fact that users will hold pointing devices in their hands at different x-axis rotational positions, but that the sensing axes of the rotational sensors 502 and 504 in the 3D pointing devices 400 are fixed. It is desirable that cursor translation across display 408 is substantially insensitive to the way in which the user grips the 3D pointing device 400, e.g., rotating the 3D pointing device 400 back and forth in a manner generally corresponding to the horizontal dimension ($x_2$-axis) of the display 508 should result in cursor translation along the $x_2$-axis, while rotating the 3D pointing device up and down in a manner generally corresponding to the vertical dimension ($y_2$-axis) of the display 508 should result in cursor translation along the $y_2$-axis, regardless of the orientation in which the user is holding the 3D pointing device 400.

To better understand the need for tilt compensation according to exemplary embodiments of the present invention, consider the example shown in FIG. 6(*a*). Therein, the user is holding 3D pointing device 400 in an exemplary inertial frame of reference, which can be defined as having an x-axis rotational value of 0 degrees, e.g., the inertial frame of reference can that in which the 3D device has its bottom substantially parallel to a floor of a room in which, e.g., a television is located. The inertial frame of reference can, purely as an example, correspond to the orientation illustrated in FIG. 6(*a*) or it can be defined as any other orientation. Rotation of the 3D pointing device 400 in either the y-axis or z-axis directions will be sensed by rotational sensors 502 and 504, respectively. For example, rotation of the 3D pointing device 400 around the z-axis by an amount Δz as shown in FIG. 6(*b*) will result in a corresponding cursor translation $\Delta x_2$ in the $x_2$ axis dimension across the display 408 (i.e., the distance between the dotted version of cursor 410 and the undotted version).

If, on the other hand, the user holds the 3D pointing device 400 in a different orientation, e.g., with some amount of x-axis rotation relative to the inertial frame of reference, then the information provided by the sensors 502 and 504 would not (absent tilt compensation) provide an accurate representation of the user's intended interface actions. For example, referring to FIG. 6(*c*), consider a situation wherein the user holds the 3D pointing device 400 with an x-axis rotation of 45 degrees relative to the exemplary inertial frame of reference as illustrated in FIG. 6(*a*). Assuming the same z-axis rotation Δz is imparted to the 3D pointing device 400 by a user as in the example of FIG. 6(*b*), the cursor 410 will instead be translated in both the $x_2$-axis direction and the $y_2$-axis direction as shown in FIG. 6(*d*). This is due to the fact that the sensing axis of rotational sensor 502 is now oriented between the y-axis and the z-axis (because of the orientation of the device in the user's hand). Similarly, the sensing axis of the rotational sensor 504 is also oriented between the y-axis and the z-axis (although in a different quadrant). In order to provide an interface which is transparent to the user in terms of how the 3D pointing device 400 is held, tilt compensation according to exemplary embodiments of the present invention translates the readings output from rotational sensors 502 and 504 back into the inertial frame of reference as part of processing the readings from these sensors into information indicative of rotational motion of the 3D pointing device 400.

According to exemplary embodiments of the present invention, returning to FIG. 5, this can be accomplished by determining the tilt of the 3D pointing device 400 using the inputs y and z received from accelerometer 506 at function 622. More specifically, after the acceleration data is converted and calibrated as described above, it can be low pass filtered at LPF 624 to provide an average acceleration (gravity) value to the tilt determination function 622. Then, tilt θ can be calculated in function 622 as:

$$\theta = \tan^{-1}\left(\frac{y}{z}\right) \quad (7)$$

The value θ can be numerically computed as atan 2(y,z) to prevent division by zero and give the correct sign. Then, function 620 can perform the rotation R of the converted/calibrated inputs αy and αz using the equation:

$$R = \begin{bmatrix} \cos\theta & \sin\theta \\ -\sin\theta & \cos\theta \end{bmatrix} \cdot \begin{bmatrix} \alpha y \\ \alpha z \end{bmatrix} \quad (8)$$

to rotate the converted/calibrated inputs αy and αz to compensate for the tilt θ. Tilt compensation as described in this exemplary embodiment is a subset of a more general technique for translating sensor readings from the body frame of reference into a user's frame of reference according to another exemplary embodiment of the present invention which is described below.

Once the calibrated sensor readings have been compensated for linear acceleration, processed into readings indicative of angular rotation of the 3D pointing device 400, and compensated for tilt, post-processing can be performed at blocks 626 and 628. Exemplary post-processing can include compensation for various factors such as human tremor. Although tremor may be removed using several different methods, one way to remove tremor is by using hysteresis. The angular velocity produced by rotation function 620 is integrated to produce an angular position. Hysteresis of a calibrated magnitude is then applied to the angular position. The derivative is taken of the output of the hysteresis block to again yield an angular velocity. The resulting output is then scaled at function 628 (e.g., based on the sampling period) and used to generate a result within the interface, e.g., movement of a cursor 410 on a display 408.

Figure 7:
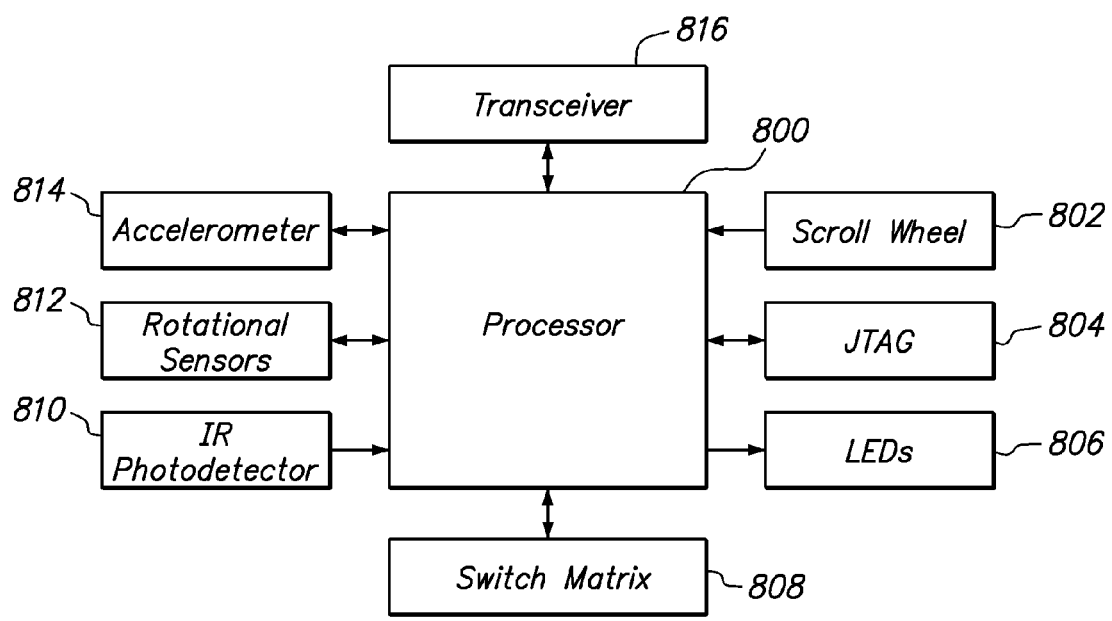
FIG. 7 depicts a hardware architecture of a 3D pointing device according to an exemplary embodiment of the present invention.

Having provided a process description of exemplary 3D pointing devices according to the present invention, FIG. 7 illustrates an exemplary hardware architecture. Therein, a processor 800 communicates with other elements of the 3D pointing device including a scroll wheel 802, JTAG 804, LEDs 806, switch matrix 808, IR photodetector 810, rotational sensors 812, accelerometer 814 and transceiver 816. The scroll wheel 802 is an optional input component which enables a user to provide input to the interface by rotating the scroll wheel 802 clockwise or counterclockwise. JTAG 804 provides the programming and debugging interface to the processor. LEDs 806 provide visual feedback to a user, for example, when a button is pressed. Switch matrix 808 receives inputs, e.g., indications that a button on the 3D pointing device 400 has been depressed or released, that are then passed on to processor 800. The optional IR photodetector 810 can be provided to enable the exemplary 3D pointing device to learn IR codes from other remote controls. Rotational sensors 812 provide readings to processor 800 regarding, e.g., the y-axis and z-axis rotation of the 3D pointing device as described above. Accelerometer 814 provides readings to processor 800 regarding the linear acceleration of the 3D pointing device 400 which can be used as described above, e.g., to perform tilt compensation and to compensate for errors which linear acceleration introduces into the rotational readings generated by rotational sensors 812. Transceiver 816 is used to communicate information to and from 3D pointing device 400, e.g., to the system controller 228 or to a processor associated with a computer. The transceiver 816 can be a wireless transceiver, e.g., operating in accordance with the Bluetooth standards for short-range wireless communication or an infrared transceiver. Alternatively, 3D pointing device 400 can communicate with systems via a wireline connection.

In the exemplary embodiment of FIG. 4, the 3D pointing device 400 includes two rotational sensors 502 and 504, as well as an accelerometer 506. However, according to another exemplary embodiment of the present invention, a 3D pointing device can alternatively include just one rotational sensor, e.g., for measuring angular velocity in the z-axis direction, and an accelerometer. For such an exemplary embodiment, similar functionality to that described above can be provided by using the accelerometer to determine the angular velocity along the axis which is not sensed by the rotational sensor. For example, rotational velocity around the y-axis can be computed using data generated by the accelerometer and calculating:

$$\omega_Y = \frac{\partial \theta_Y}{\partial t} = \frac{\partial}{\partial t} \tan^{-1}\left(\frac{x}{z}\right) \quad (9)$$

In addition, the parasitic acceleration effects that are not measured by a rotational sensor should also be removed. These effects include actual linear acceleration, acceleration measured due to rotational velocity and rotational acceleration, and acceleration due to human tremor.

Stationary detection function 608, mentioned briefly above, can operate to determine whether the 3D pointing device 400 is, for example, either stationary or active (moving). This categorization can be performed in a number of different ways. One way, according to an exemplary embodiment of the present invention, is to compute the variance of the sampled input data of all inputs (x, y, z, αy, αz) over a predetermined window, e.g., every quarter of a second. This variance is then compared with a threshold to classify the 3D pointing device as either stationary or active.

Another stationary detection technique according to exemplary embodiments of the present invention involves transforming the inputs into the frequency domain by, e.g., performing a Fast Fourier Transform (FFT) on the input data. Then, the data can be analyzed using, e.g., peak detection methods, to determine if the 3D pointing device 400 is either stationary or active. Additionally, a third category can be distinguished, specifically the case where a user is holding the 3D pointing device 400 but is not moving it (also referred to herein as the "stable" state. This third category can be distinguished from stationary (not held) and active by detecting the small movement of the 3D pointing device 400 introduced by a user's hand tremor when the 3D pointing device 400 is being held by a user. Peak detection can also be used by stationary detection function 608 to make this determination. Peaks within the range of human tremor frequencies, e.g., nominally 8-12 Hz, will typically exceed the noise floor of the device (experienced when the device is stationary and not held) by approximately 20 dB.

In the foregoing examples, the variances in the frequency domain were sensed within a particular frequency range, however the actual frequency range to be monitored and used to characterize the status of the 3D pointing device 400 may vary. For example, the nominal tremor frequency range may shift based on e.g., the ergonomics and weight of the 3D pointing device 400, e.g., from 8-12 Hz to 4-7 Hz.

Figure 8:
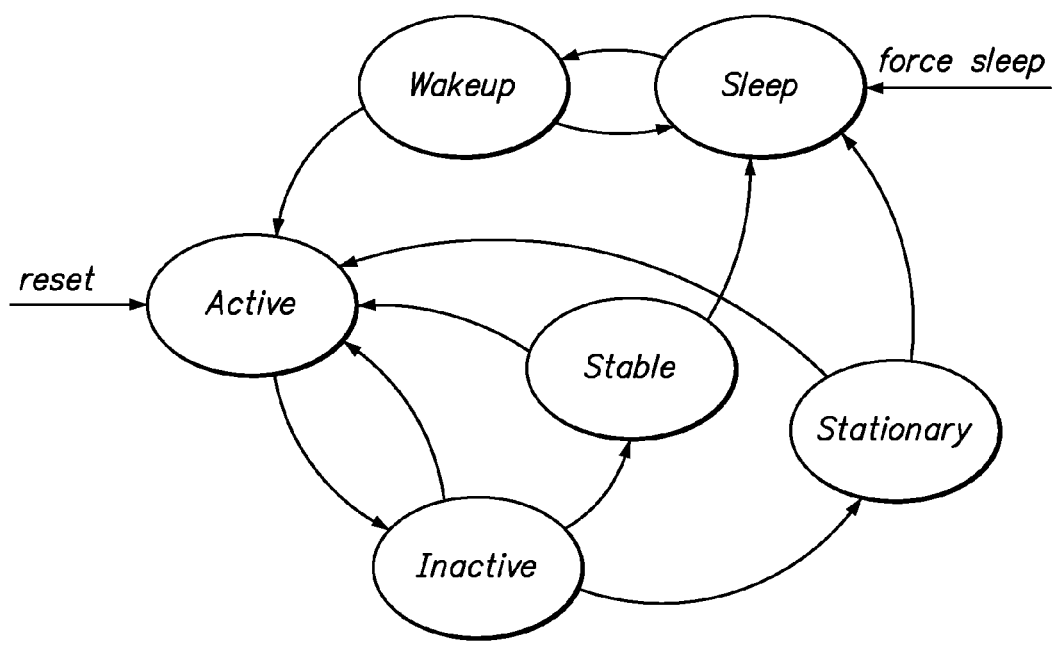
FIG. 8 is a state diagram depicting a stationary detection mechanism according to an exemplary embodiment of the present invention.

According to another exemplary embodiment of the present invention, stationary detection mechanism 608 can include a state machine. An exemplary state machine is shown in FIG. 8. Therein, the ACTIVE state is, in this example, the default state during which the 3D pointing device 400 is moving and being used to, e.g., provide inputs to a user interface. The 3D pointing device 400 can enter the ACTIVE state on power-up of the device as indicated by the reset input. If the 3D pointing device 400 stops moving, it may then enter the INACTIVE state. The various state transitions illustrated in FIG. 8 can be triggered by any of a number of different criteria including, but not limited to, data output from one or both of the rotational sensors 502 and 504, data output from the accelerometer 506, time domain data, frequency domain data or any combination thereof. State transition conditions will be generically referred to herein using the convention "Condition$_{stateA\_stateB}$". For example, the 3D pointing device 400 will transition from the ACTIVE state to the INACTIVE state when condition$_{active\_inactive}$ occurs. For the sole purpose of illustration, consider that condition$_{active\_inactive}$ can, in an exemplary 3D pointing device 400, occur when mean and/or standard deviation values from both the rotational sensor(s) and the accelerometer fall below first predetermined threshold values for a first predetermined time period.

State transitions can be determined by a number of different conditions based upon the interpreted sensor outputs. Exemplary condition metrics include the variance of the interpreted signals over a time window, the threshold between a reference value and the interpreted signal over a time window, the threshold between a reference value and the filtered interpreted signal over a time window, and the threshold between a reference value and the interpreted signal from a start time can be used to determine state transitions. All, or any combination, of these condition metrics can be used to trigger state transitions. Alternatively, other metrics can also be used. According to one exemplary embodiment of the present invention, a transition from the INACTIVE state to the ACTIVE state occurs either when (1) a mean value of sensor output(s) over a time window is greater than predetermined threshold(s) or (2) a variance of values of sensor output(s) over a time window is greater than predetermined threshold(s) or (3) an instantaneous delta between sensor values is greater than a predetermined threshold.

The INACTIVE state enables the stationary detection mechanism 608 to distinguish between brief pauses during which the 3D pointing device 400 is still being used, e.g., on the order of a tenth of a second, and an actual transition to either a stable or stationary condition. This protects against the functions which are performed during the STABLE and STATIONARY states, described below, from inadvertently being performed when the 3D pointing device is being used. The 3D pointing device 400 will transition back to the ACTIVE state when condition$_{inactive \to active}$ occurs, e.g., if the 3D pointing device 400 starts moving again such that the measured outputs from the rotational sensor(s) and the accelerometer exceeds the first threshold before a second predetermined time period in the INACTIVE state elapses.

The 3D pointing device 400 will transition to either the STABLE state or the STATIONARY state after the second predetermined time period elapses. As mentioned earlier, the STABLE state reflects the characterization of the 3D pointing device 400 as being held by a person but being substantially unmoving, while the STATIONARY state reflects a characterization of the 3D pointing device as not being held by a person. Thus, an exemplary state machine according to the present invention can provide for a transition to the STABLE state after the second predetermined time period has elapsed if minimal movement associated with hand tremor is present or, otherwise, transition to the STATIONARY state.

The STABLE and STATIONARY states define times during which the 3D pointing device 400 can perform various functions. For example, since the STABLE state is intended to reflect times when the user is holding the 3D pointing device 400 but is not moving it, the device can record the movement of the 3D pointing device 400 when it is in the STABLE state e.g., by storing outputs from the rotational sensor(s) and/or the accelerometer while in this state. These stored measurements can be used to determine a tremor pattern associated with a particular user or users as described below. Likewise, when in the STATIONARY state, the 3D pointing device 400 can take readings from the rotational sensors and/or the accelerometer for use in compensating for offset as described above.

If the 3D pointing device 400 starts to move while in either the STABLE or STATIONARY state, this can trigger a return to the ACTIVE state. Otherwise, after measurements are taken, the device can transition to the SLEEP state. While in the sleep state, the device can enter a power down mode wherein power consumption of the 3D pointing device is reduced and, e.g., the sampling rate of the rotational sensors and/or the accelerometer is also reduced. The SLEEP state can also be entered via an external command so that the user or another device can command the 3D pointing device 400 to enter the SLEEP state.

Upon receipt of another command, or if the 3D pointing device 400 begins to move, the device can transition from the SLEEP state to the WAKEUP state. Like the INACTIVE state, the WAKEUP state provides an opportunity for the device to confirm that a transition to the ACTIVE state is justified, e.g., that the 3D pointing device 400 was not inadvertently jostled.

The conditions for state transitions may be symmetrical or may differ. Thus, the threshold associated with the condition$_{active \to inactive}$ may be the same as (or different from) the threshold(s) associated with the condition$_{inactive \to active}$. This enables 3D pointing devices according to the present invention to more accurately capture user input. For example, exemplary embodiments which include a state machine implementation allow, among other things, for the threshold for transition into a stationary condition to be different than the threshold for the transition out of a stationary condition.

Entering or leaving a state can be used to trigger other device functions as well. For example, the user interface can be powered up based on a transition from any state to the ACTIVE state. Conversely, the 3D pointing device and/or the user interface can be turned off (or enter a sleep mode) when the 3D pointing device transitions from ACTIVE or STABLE to STATIONARY or INACTIVE. Alternatively, the cursor 410 can be displayed or removed from the screen based on the transition from or to the stationary state of the 3D pointing device 400.

As mentioned above, exemplary embodiments of the present invention process movement data received from sensor(s) in the 3D pointing device to convert this data from the frame of reference of the 3D pointing device's body into another frame of reference, e.g., the user's frame of reference. In the exemplary application of a 3D pointing device used to control a user interface displayed on a screen, e.g., a television, the user's frame of reference might be a coordinate system associated with the television screen. Regardless, translation of the data from the body frame of reference into another frame of reference improves the usability of the handheld device by resulting in an operation that is from the user's perspective rather than the device's perspective. Thus, when the user moves his or her hand from left to right in front of a display while holding the 3D pointing device, the cursor will move in the left to right direction regardless of the orientation of the 3D pointing device.

Figure 9:
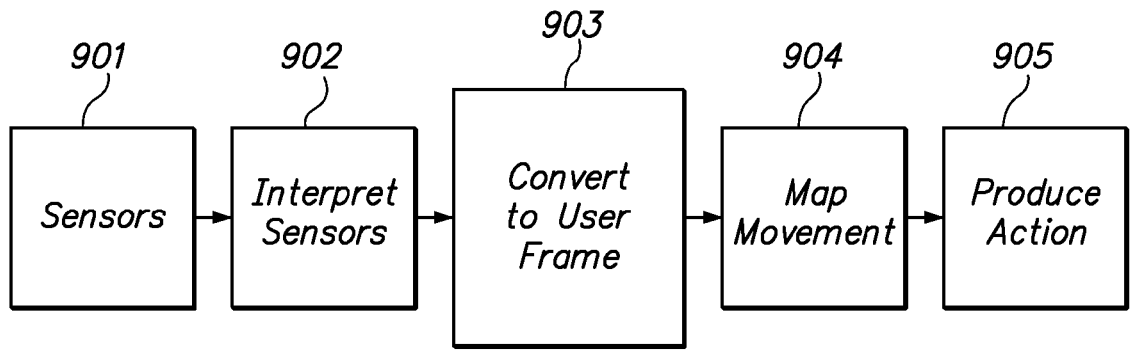
FIG. 9 is a block diagram illustrating transformation of sensed motion data from a first frame of reference into a second frame of reference according to an exemplary embodiment of the present invention.

To simplify this discussion an exemplary processing system associated with a 3D pointing device is shown in FIG. 9, e.g., as described in more detail above. Therein, the handheld system senses motion using one or more sensors 901, e.g., rotational sensor(s), gyroscopes(s), accelerometer(s), magnetometer(s), optical sensor(s), camera(s) or any combination thereof. The sensors are then interpreted in block 902 to produce an estimate of the motion that occurred. The processing block 903 then translates the measured motion from the natural (body) reference frame of the device into the reference frame of the user. The movement is then mapped 904 into meaningful actions that are interpreted at block 905 forwarded to the system to produce a meaningful response, such as moving an on-screen cursor.

Block 903 converts detected movement into the reference frame of the user instead of the reference frame of the device. Orientation may be represented by many different mathematically similar methods including Euler angles, a direction cosine matrix (DCM), or a unit quaternion. Position is generally represented as an offset from the coordinate system origin in a consistent unit including but not limited to meters, centimeters, feet, inches, and miles. In one exemplary embodiment described above, a 3D pointing device measures inertial forces including acceleration and rotational velocity. These forces are measured relative to the body of the device by sensors mounted therein. In order to convert the measured data into the user frame of reference, the device estimates both its position and its orientation.

Figure 10:
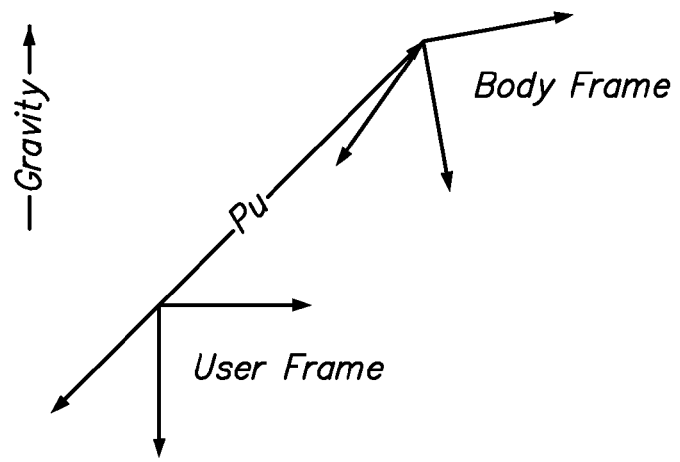
FIG. 10 graphically illustrates the transformation of sensed motion data from a first frame of reference into a second frame of reference according to an exemplary embodiment of the present invention.

In this exemplary embodiment, it is assumed that the user frame of reference is stationary and has fixed orientation, although those skilled in the art will appreciate that this technique in accordance with the present invention can be readily extended to the cases where the user's frame of reference is non-stationary by either directly transforming to the time-varying frame or by first converting to a stationary frame and then converting to the moving frame. For the stationary, fixed-orientation user frame of reference example, conversion from the body frame to the user frame can be performed by use of the following equations:

$$Pu = \text{Rotate}(Pb, Q) + P\text{delta}$$

$$Pu' = \text{Rotate}(Pb', Q)$$

$$Pu'' = \text{Rotate}(Pb'', Q)$$

$$Wu = \text{Rotate}(Wb, Q)$$

$$Wu' = \text{Rotate}(Wb', Q)$$

where:

Rotate represents the quaternion rotation operator such that Rotate(A, Q) is equal to Q*A Q where Q* is the quaternion conjugate and the vector A is a quaternion with the complex component equal to A and the real component equal to 0;

Pu is the position in the user frame of reference;

Pb is the position in the device frame of reference;

' represents the derivative. Therefore, Pu' is the derivative of the position in the user frame of reference which is the velocity in the user frame of reference;

Wu is the angular velocity of the device in body angles in the user frame of reference;

Wb is the angular velocity of the device in body angles in the body frame of the device;

Pdelta is the difference between the origin of the user frame of reference and the body frame of reference in the user frame of reference coordinate system;

Q is the normalized rotation quaternion that represents the rotation from the body frame to the user frame. Since the rotation quaternion to rotate from the user frame to the body frame is Q*, we could replace Q with R* where R is the rotation from the user frame to the body frame. Note that Q can be represented in a number of equivalent forms including Euler angles and the direction cosine matrix (DCM), and the above equations may vary slightly in their equivalent forms based upon different representations of Q. FIG. 10 graphically illustrates the transformation from a body frame of reference to a user's frame of reference.

During operation, the device estimates Q in an implementation dependent manner to perform this transformation. One exemplary implementation described above involves compensating for tilt (i.e., variations in x-axis roll of the 3D pointing device based on the manner in which it is held by a user). The orientation is computed by first estimating the acceleration component due to gravity in the body frame, Ab. By definition, the acceleration vector due to gravity in the user frame, Ag, is set to [0, 0, −1]. Since gravity cannot estimate the heading (rotation about the z-axis), the body frame estimate for heading is used. Therefore, the rotation quaternion has an axis of rotation in the z=0 plane. The following is one of several mathematically equivalent methods for computing the rotation quaternion:

$$V=\|Ab\|\times\|Ag\|\text{(cross product of unit vectors)}$$

$$qV=\|V\|$$

$$\alpha=\sin^{-1}|V|$$

$$Q=\text{Quaternion}[qV,\alpha]=[qV*\sin(\alpha/2),\cos(\alpha/2)]$$

Position is then computed as the double integral of the acceleration in the user frame. The acceleration in the user frame is the acceleration of the body frame rotated into the user frame by Q above. Normally, the origin is assumed to be zero when the device is first activated, but the origin may be reset during normal operation either manually or automatically.

Generally, when the device is not moving, Pu', Pu", Wu, and Wu" are all 0. In this exemplary embodiment, Pb" and Wb are measured. Although an infinite number of rotations Q exist, the minimal rotation can be selected from the available set and used to estimate Wu based on Wb. Alternatively, Q may be computed using an assumed starting offset orientation Qo, by integrating Wb over time as shown using the discrete time integral below:

$$Wb\text{Angle}=|Wb|*\text{period}$$

$$Q_{DELTA}=\text{Quaternion}[Wb,Wb\text{Angle}]=[\|Wb\|*\sin(Wb\text{Angle}/2),\cos(Wb\text{Angle}/2)]$$

$$Q_{NEXT}=Q_0**Q_{DELTA}$$

Where * represents multiplication and ** represents quaternion multiplication. Additional stability can be provided by constant field vectors including gravity and the earth's magnetic field and combined with the results above. The combination can be achieved using several numerical and filtering methods including, but not limited to, Kalman filtering.

A variety of different sensors could be employed as long as they measure motion with respect to the body of the device. Exemplary sensors include accelerometers, rotational sensors, gyroscopes, magnetometers and cameras. The user frame does not need to be stationary. For example, if the user's frame of reference is selected to be the user's forearm, then the device would only respond to wrist and finger movement.

One skilled in the art will recognize the commutative property applies to the frame of reference transformations described in this invention. Therefore, the order of the mathematical operations can be altered without materially affecting the invention described herein. In addition, many motion processing algorithms can operate in either frame of reference equivalently, especially when the user frame is chosen to be stationary with a constant orientation.

In addition to providing ease of use, frame of reference transformations according to this exemplary embodiment of the present invention can also be used to address other challenges in handheld device implementations. For example, if a sensor (such as an accelerometer) is not located precisely at the center of rotation in the body frame of reference, the measured acceleration will include both the acceleration of the frame and acceleration components due to the rotation of the frame. Therefore, the measured acceleration can first be transformed to a different target location within the body frame of the device using the following relationship:

$$A\text{body}=A\text{accelerometer}+\omega'\times R+\omega\times(\omega\times R)$$

where R is the vector from the accelerometer to the target location, ω is the angular velocity of the body frame of reference and ω' is the angular acceleration of the body frame of reference. If the body frame of the device is constructed such that it lies at R from the accelerometer, then it should have zero angular acceleration effects and may be more easily used to compute the device movement in the user frame. This compensates for intentional or unintentional misalignment between the accelerometer and the center of the body frame of reference. In addition, the estimate of the gravity vector becomes much simpler since there are fewer forces acting at the center of rotation. Then, $$A\text{user}=\text{Rotate}(A\text{body},Q)$$

where Q is the rotation from the body frame of reference to the accelerometer frame of reference.

Unfortunately, different users have different values for R. For example, one user may use the handheld device by rotating their elbow while another may use the device by rotating their wrist. In addition, people have different sized wrists and forearms. For improved usability this exemplary embodiment of the handheld dynamically computes R and moves the body origin such that it has minimal acceleration components due to angular motion. The exemplary embodiment estimates R by defining R as [Rx, 0, 0] and solving for Rx using and minimizing Abody−Rotate[Ag, Q]. Note that many numerical methods exist including recursive least squares and Kalman filtering that may perform minimization to compute Rx.

Based on the foregoing, it will be appreciated that the present invention describes various techniques for mapping sensed motion of a handheld device from one frame of reference (e.g., a body frame of reference) to another frame of reference (e.g., a user's frame of reference). These mappings can be independent from other mappings associated with the use of the handheld device, e.g., the mapping of sensed motion to cursor movement or can be combined therewith. Moreover, transformations according to the present invention can be performed to transform the sensed motion in all three dimensions, for translational motion and rotational motion or any subset thereof, from the perspective of either the input side of the motion equation or the output side. Additionally, the selection of the frame of reference into which the sensed motion is mapped or transformed can be made in a number of different ways. One example provided above shows the second frame of reference being a user's frame of reference associated with the tilt of the device, however many other variations are possible. For example, the user may select his or her desired frame of reference, which setting can be stored in the handheld as one of a plurality of user preferences and used to perform the transformation. The second frame of reference can be selected based on any number of techniques. The second frame of reference can be selected based upon an explicit command (e.g., button or user interface selection) or automatically through user recognition determined by device use patterns, tremor, and other biometrics.

Additionally, although some of the exemplary embodiments describe above operate on data in the velocity domain, the present invention is not so limited. Mapping or transformation according to the present invention can alternatively or additionally be performed on, for example, position or acceleration data and can be for translational motion, rotational motion or both. Also the order of processing is not critical. For example, if the handheld device is being used to output gesture commands, the mapping can be performed first and then the gesture determined or the gesture can be determined first and then the mapping can be performed.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the foregoing exemplary embodiments describe, among other things, the use of inertial sensors to detect movement of a device, other types of sensors (e.g., ultrasound, magnetic or optical) can be used instead of, or in addition to, inertial sensors in conjunction with the afore-described signal processing. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A handheld pointing device comprising:
a first rotational sensor for determining rotation of said handheld pointing device about a first axis and generating a first rotational output associated therewith;
a second rotational sensor for determining rotation of said handheld pointing device about a second axis and generating a second rotational output associated therewith;
a three-axis accelerometer for determining an acceleration of said handheld pointing device and outputting an acceleration output associated therewith; and
a processing unit for receiving said first and second rotational outputs and said acceleration output and for:

(a) determining a tilt relative to gravity associated with an orientation in which said handheld pointing device is held, wherein said tilt is determined based upon the acceleration output,
(b) converting said first and second rotational outputs from a body frame of reference associated with said handheld pointing device into a user's frame of reference in order to remove the effects of said determined tilt; and
(c) determining data associated with x and y coordinates which are in turn associated with movement of a screen cursor said data based on said converted first and second rotational outputs, wherein said step of converting renders said movement of said screen cursor independent of said tilt.

2. The handheld pointing device of claim 1, wherein said user's frame of reference is associated with a television screen.

3. The handheld pointing device of claim 1, wherein the handheld pointing device is a free space pointing device.

4. The handheld pointing device of claim 1, wherein said tilt is determined based upon the acceleration output when the handheld pointing device is moving.

5. The handheld pointing device of claim 1, wherein said tilt is determined based upon the acceleration output when the handheld pointing device is not moving.

6. The handheld pointing device of claim 1, wherein said step of converting includes converting only said first and second rotational outputs.

7. The handheld pointing device of claim 1, wherein said step of converting includes removing the effects of roll based on said determined tilt, wherein any effects of pitch are not removed.

8. The handheld pointing device of claim 1, wherein said screen cursor is viewable on a display external to said handheld pointing device.

9. The handheld pointing device of claim 1, wherein said data is based directly on said converted first and second rotational outputs.

10. The handheld pointing device of claim 1, wherein said step of converting further comprises the step of:
rotating said first and second rotational outputs into said user's frame of reference by calculating:

$$R = \begin{bmatrix} \cos\theta & \sin\theta \\ -\sin\theta & \cos\theta \end{bmatrix} \cdot \begin{bmatrix} \alpha y \\ \alpha z \end{bmatrix},$$

wherein θ is said determined tilt, αy is said first rotational output and αz is said second rotational output.

11. A method for operating a handheld pointing device comprising the steps of:
determining, using a three-axis accelerometer, a tilt relative to gravity associated with an orientation in which said handheld pointing device is held;
detecting, using first and second rotational sensors, rotational movement of said handheld pointing device about a first axis and a second axis respectively; and
transforming said detected movement from a body frame of reference associated with said handheld pointing device into an inertial frame of reference, wherein the transforming step includes compensating said detected rotational movement to correct the detected rotational movement for said determined tilt.

12. The method of claim 11, wherein said tilt is determined based upon an acceleration output when the handheld pointing device is moving.

13. The method of claim 11, wherein said tilt is determined based upon an acceleration output when the handheld pointing device is not moving.

14. The method of claim 11, wherein said transforming step includes compensating said detected rotational movement to remove the effects of roll based on said determined tilt, wherein any effects of pitch are not removed.

15. The method of claim 11, wherein said screen cursor is viewable on a display external to said handheld pointing device.

16. The method of claim 11, wherein said step of compensating said detected rotational movement to correct for said tilt comprises the step of:

rotating first and second rotational outputs of said first and second rotational sensors into said inertial frame of reference by calculating:

$$R = \begin{bmatrix} \cos\theta & \sin\theta \\ -\sin\theta & \cos\theta \end{bmatrix} \cdot \begin{bmatrix} \alpha y \\ \alpha z \end{bmatrix},$$

wherein $\theta$ is said determined tilt, $\alpha y$ is said first rotational output and $\alpha z$ is said second rotational output.

17. The method of claim 11, further comprising the step of:
providing information associated with said compensated, detected movement as input to a user interface.

18. The method of claim 11, wherein the handheld pointing device is a free space pointing device.

* * * * *